(12) United States Patent
May et al.

(10) Patent No.: US 7,961,759 B2
(45) Date of Patent: Jun. 14, 2011

(54) METHOD AND APPARATUS FOR SYNCHRONIZED CHANNEL TRANSMISSION

(75) Inventors: Michael R. May, Austin, TX (US); James Ward Girardeau, Jr., Austin, TX (US); Paul M. Astrachan, Austin, TX (US); Mathew A. Rybicki, Austin, TX (US)

(73) Assignee: ViXS Systems, Inc., Toronto, Ontario ( * ) Notice: Subject to any disclaimer, the term of this patent is extended or adjusted under 35 U.S.C. 154(b) by 1713 days.

(21) Appl. No.: 10/376,806

(22) Filed: Feb. 28, 2003

(65) Prior Publication Data

US 2004/0125787 A1 Jul. 1, 2004

Related U.S. Application Data

(60) Provisional application No. 60/437,361, filed on Dec. 31, 2002, now abandoned.

(51) Int. Cl.
*H04J 3/06* (2006.01)
(52) U.S. Cl. ........................................ 370/503
(58) Field of Classification Search .............. 370/328, 370/330, 336, 334, 345, 350, 431, 436, 442, 370/480, 498, 503, 516
See application file for complete search history.

(56) References Cited

U.S. PATENT DOCUMENTS

| | | | | |
|---|---|---|---|---|
| 6,064,662 A * | 5/2000 | Gitlin et al. | ................... | 370/330 |
| 6,275,506 B1 * | 8/2001 | Fazel et al. | ................... | 370/478 |
| 6,650,630 B1 * | 11/2003 | Haartsen | ........................ | 370/345 |
| 2001/0005375 A1 * | 6/2001 | Yamamoto et al. | ........... | 370/436 |
| 2002/0003773 A1 * | 1/2002 | Okada et al. | ................... | 370/208 |
| 2002/0057661 A1 * | 5/2002 | Raith | ............................. | 370/337 |
| 2002/0085525 A1 * | 7/2002 | Ikegawa | ........................ | 370/336 |
| 2002/0131434 A1 * | 9/2002 | Vukovic et al. | ............... | 370/411 |
| 2003/0103446 A1 * | 6/2003 | Negishi et al. | ................ | 370/208 |

FOREIGN PATENT DOCUMENTS

WO     WO 0217524 A1 *     2/2002

* cited by examiner

*Primary Examiner* — Kevin C Harper
(74) *Attorney, Agent, or Firm* — Garlick Harrison & Markison; Bruce E. Stuckman

(57) ABSTRACT

A method and apparatus for synchronized channel transmission are disclosed. One embodiment of the method comprises: generating a first data stream and a second data stream; packetizing the first data stream to produce a first plurality of data packets; packetizing the second data stream to produce a second plurality of data packets; baseband processing the first plurality of data packets to produce a first plurality of symbols for each of the first plurality of data packets; baseband processing the second plurality of data packets to produce a second plurality of symbols for each of the second plurality of data packets; converting the first plurality of symbols into a first radio frequency signal; converting the second plurality of symbols into a second radio frequency signal; and synchronizing at least one of: generating the first and the second data streams, packetizing the first and second data streams, baseband processing the first and second plurality of data packets, and converting the first and second plurality of symbols.

56 Claims, 15 Drawing Sheets interference in burst of data interference in burst of data interference in burst of data

140 apparatus 400

METHOD AND APPARATUS FOR SYNCHRONIZED CHANNEL TRANSMISSION

This patent application is claiming priority under 35 USC §119 to a provisionally filed patent application entitled METHOD AND APPARATUS FOR SYNCHRONIZED CHANNEL TRANSMISSION, having a provisional filing date of Dec. 31, 2002, and a provisional Ser. No. 60/437,361.

TECHNICAL FIELD OF THE INVENTION

This invention relates generally to communication systems and, more particularly, to radio frequency circuits used in such communication systems.

BACKGROUND OF THE INVENTION

As is known, wireless communication systems include a plurality of wireless communication devices and wireless infrastructure devices. The wireless communication devices, which may be radios, cellular telephones, stations coupled to personal computers, laptops, personal digital assistants, et cetera, communicate with each other via wireless communication channels that are administered by the wireless infrastructure devices. Such wireless infrastructure devices include base stations (e.g., for cellular wireless communication systems), access points (e.g., for wireless local area networks), system controllers, system administrators, et cetera. Each type of communication system is constructed, and hence operates, in accordance with one or more communication standards. For instance, wireless communication systems may operate in accordance with one or more standards including, but not limited to, IEEE 802.11, Bluetooth, advanced mobile phone services (AMPS), digital AMPS, global system for mobile communications (GSM), code division multiple access (CDMA), local multi-point distribution systems (LMDS), multi-channel-multi-point distribution systems (MMDS), and/or variations thereof.

Depending on the type of wireless communication system, a wireless communication device communicates directly or indirectly with other wireless communication devices. For direct communications (also known as point-to-point communications), the participating wireless communication devices tune their receivers and transmitters to the same channel or multiple channels (e.g., one or more of the plurality of radio frequency (RF) carriers of the wireless communication system) and communicate over that channel or channels. For indirect wireless communications, each wireless communication device communicates directly with an associated base station (e.g., for cellular services) and/or an associated access point (e.g., for an in-home or in-building wireless network) via an assigned channel, or channels. To complete a communication connection between the wireless communication devices, the associated base stations and/or associated access points communicate with each other directly, via a system controller, via the public switch telephone network, via the internet and/or via some other wide area network.

For each wireless communication device to participate in wireless communications, it includes a built-in radio transceiver (i.e., receiver and transmitter) or is coupled to an associated radio transceiver (e.g., a station for in-home and/or in-building wireless communication networks, RF modem, etc.). As is known, a receiver receives RF signals, demodulates the RF carrier frequency from the RF signals to produce baseband signals, and demodulates the baseband signals in accordance with a particular wireless communication standard to recapture the transmitted data. A radio receiver is known to include a low noise amplifier, one or more intermediate frequency stages, filters and a receiver baseband processor. The low noise amplifier amplifies radio frequency (RF) signals received via an antenna and provides the amplified RF signals to the one or more intermediate frequency stages. The one or more intermediate frequency stages mixes the amplified RF signal with one or more local oscillations to produce a receive baseband signal. The receiver baseband processor, in accordance with a particular wireless communication standard, decodes and/or demodulates the baseband signals to recapture data therefrom.

As is also known, the transmitter converts data into RF signals by modulating the data to produce baseband signals and mixing the baseband signals with an RF carrier to produce RF signals. The radio transmitter includes a baseband processor, one or more intermediate frequency stages, filters, and a power amplifier coupled to an antenna. The baseband processor encodes and/or modulates, in accordance with a wireless communication standard such as IEEE 802.11a, IEEE802.11b, Bluetooth, Global System for Mobile communications (GSM), Advanced Mobile Phone Service (AMPS), et cetera, to produce baseband signals. The baseband processor produces an outbound baseband signal at a given processing rate. Typically, the processing rate of the transmitting baseband processor is synchronized with the transmitting local oscillation or oscillations and is a fraction of the local oscillation, or oscillations. The one or more intermediate frequency stages mix the baseband signals with one or more local oscillations to produce a radio frequency signal. The filter filters the radio frequency signal to remove unwanted frequency components and the power amplifier amplifies the filtered radio frequency signal prior to transmission via the antenna.

Further, data transmissions are serial streams of data, but within a network component (e.g., switch, relay, bridge, gateway, et cetera) the data is processed in parallel. It is a function of the transceiver within each communication device or network component to convert data from a serial to a parallel form, or vice-versa. In general, the transmitter converts parallel data into serial data and sources the serial data onto a communications link. A receiver receives serial data via a communications link and converts it into parallel data.

However, multi-channel transmission systems suffer from signal degradation and data corruption when simultaneously transmitting on channels originating from antennas within reception range of the receiver for which they are intended. This is because currently existing multi-channel systems do not provide for the synchronization of contemporaneously transmitted signals along two or more of their channels. As shown in FIG. 1, each burst of data 2 within a transmitted signal comprises multiple symbols 4 carrying a portion of the data making up the data burst. Each symbol comprises a data signal having a fixed amplitude and phase for the symbol, and a cyclic prefix (known as a guard interval in IEEE 802.11a). The cyclic prefix is essentially a portion of the symbol data repeated prior to the transmission of the data. The end portion of a symbol is copied and repeated within the cyclic prefix for the corresponding symbol. The cyclic prefix is used to allow the noise injected due to the discontinuity from symbol to symbol to settle before the data is actually sampled. As shown in FIG. 1, between the data of one symbol and the cyclic prefix of another symbol, a discontinuity results since the transmitted analog baseband signal is changing from one encoded data set to another.

Unsynchronized signals transmitted contemporaneously from antennas in range of the receiver will thus interfere with one another if the guard intervals of the symbols of one signal are not aligned with the guard intervals of the symbols of the other signal. The interference occurs because the non-aligned noise injected due to the discontinuity from symbol to symbol of one signal will disturb the data portion of the symbols on the other signal, and vice versa. This is illustrated in FIG. 2, which shows an analogous case to that of FIG. 1 for contemporaneously transmitted signals 5 and 6.

Therefore, a need exists for a method and apparatus for synchronizing signal transmission along multiple channels that can reduce or eliminate the problems associated with the prior art.

BRIEF SUMMARY OF THE INVENTION

The embodiments of the method and apparatus for synchronized channel transmission of the present invention substantially meet these needs and others. One embodiment of the method for synchronized channel transmission comprises: generating a first data stream and a second data stream; packetizing the first data stream to produce a first plurality of data packets; packetizing the second data stream to produce a second plurality of data packets; baseband processing the first plurality of data packets to produce a first plurality of symbols for each of the first plurality of data packets; baseband processing the second plurality of data packets to produce a second plurality of symbols for each of the second plurality of data packets; converting the first plurality of symbols into a first radio frequency signal; converting the second plurality of symbols into a second radio frequency signal; and synchronizing at least one of: generating the first and the second data streams, packetizing the first and second data streams, baseband processing the first and second plurality of data packets, and converting the first and second plurality of symbols.

Synchronizing the baseband processing of the first and second plurality of data packets and synchronizing the converting of the first and second plurality of symbols can comprise synchronizing a symbol boundary of one or more of the first plurality of symbols with a symbol boundary of one or more of the second plurality of symbols. This in turn comprises synchronizing a guard interval of one or more of the first plurality of symbols with a guard interval of one or more of the second plurality of symbols.

Further, synchronizing the packetizing of the first and second data streams comprises synchronizing the transmission of a first packet of the first plurality of data packets with the transmission of a first packet of the second plurality of data packets, or synchronizing the transmission of each packet of the first plurality of data packets with the transmission of a corresponding packet of the second plurality of data packets. The corresponding packet can be a closest-in-time packet of the second plurality of data packets to the each packet of the first plurality of data packets. Synchronizing the transmission of the first packets can be accomplished by delaying the transmission of one of: the first packet of the first plurality of data packets, and the first packet of the second plurality of data packets. Similarly, synchronizing the transmission of each packet of the first plurality of data packets with the transmission of a corresponding packet of the second plurality of data packets can be accomplished by delaying, on a packet by packet basis, the transmission of one of: the each packet of the first plurality of data packets, and the corresponding packet of the second plurality of data packets.

The embodiments of the method and apparatus for synchronized channel transmission of the present invention can thus reduce or eliminate the interference that can occur between signals originating from unsynchronized channels transmitted from antennas within reception range of a receiver.

The embodiments of the method and apparatus of this invention can further comprise encrypting and/or modulating the first and the second data streams. Modulation can occur according to a preset modulation scheme, such as orthogonal frequency-division multiplexing. Generating the first and second data streams can also be synchronized by synchronizing the start of each of the first and the second data streams. The various embodiments of the method and apparatus of this invention can be incorporated in a radio or other wireless communication device and can comprise a multi-channel transmitter within such a radio or other device. Further, embodiments of this invention can be incorporated in a multimedia server that provides multiple data streams to a plurality of client modules.

DETAILED DESCRIPTION OF THE INVENTION

Figure 1:
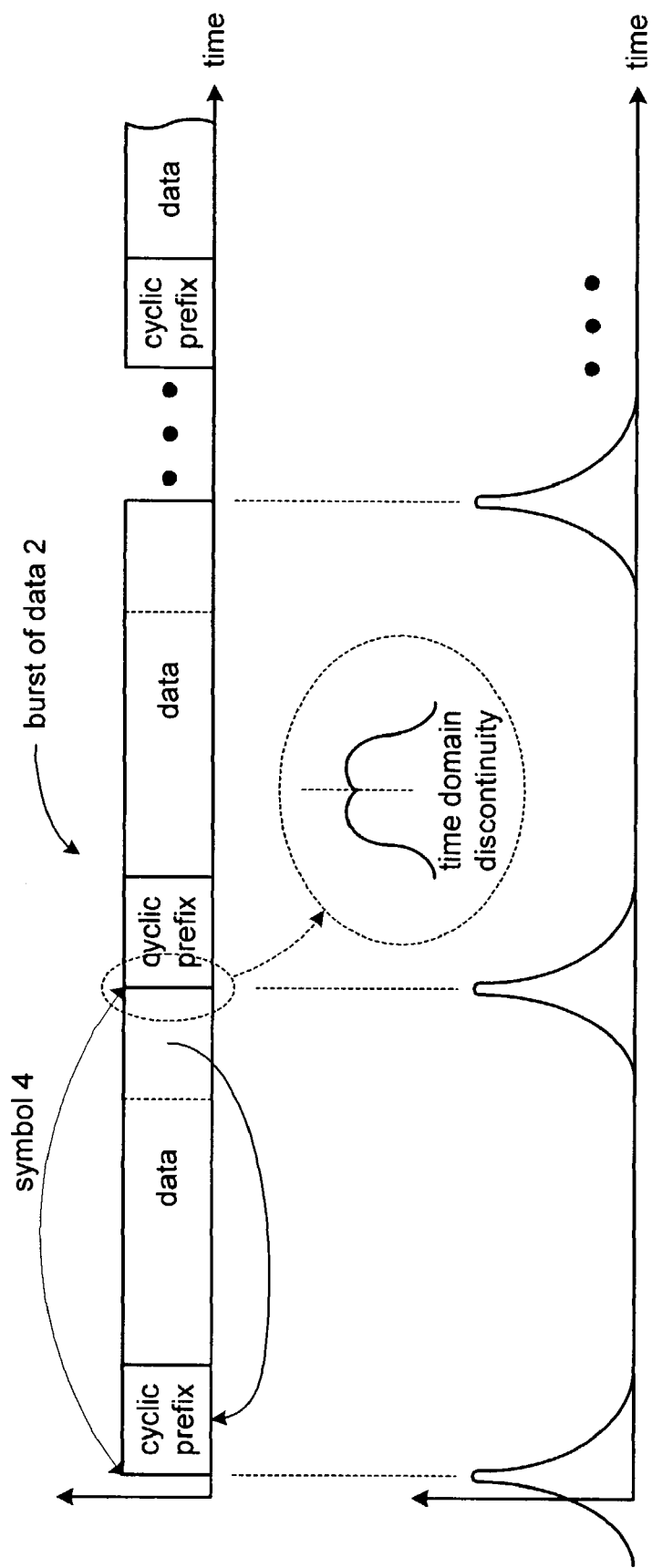
FIG. 1 is a time domain representation of bursts of data and corresponding noise in accordance with the present invention.
Figure 2:
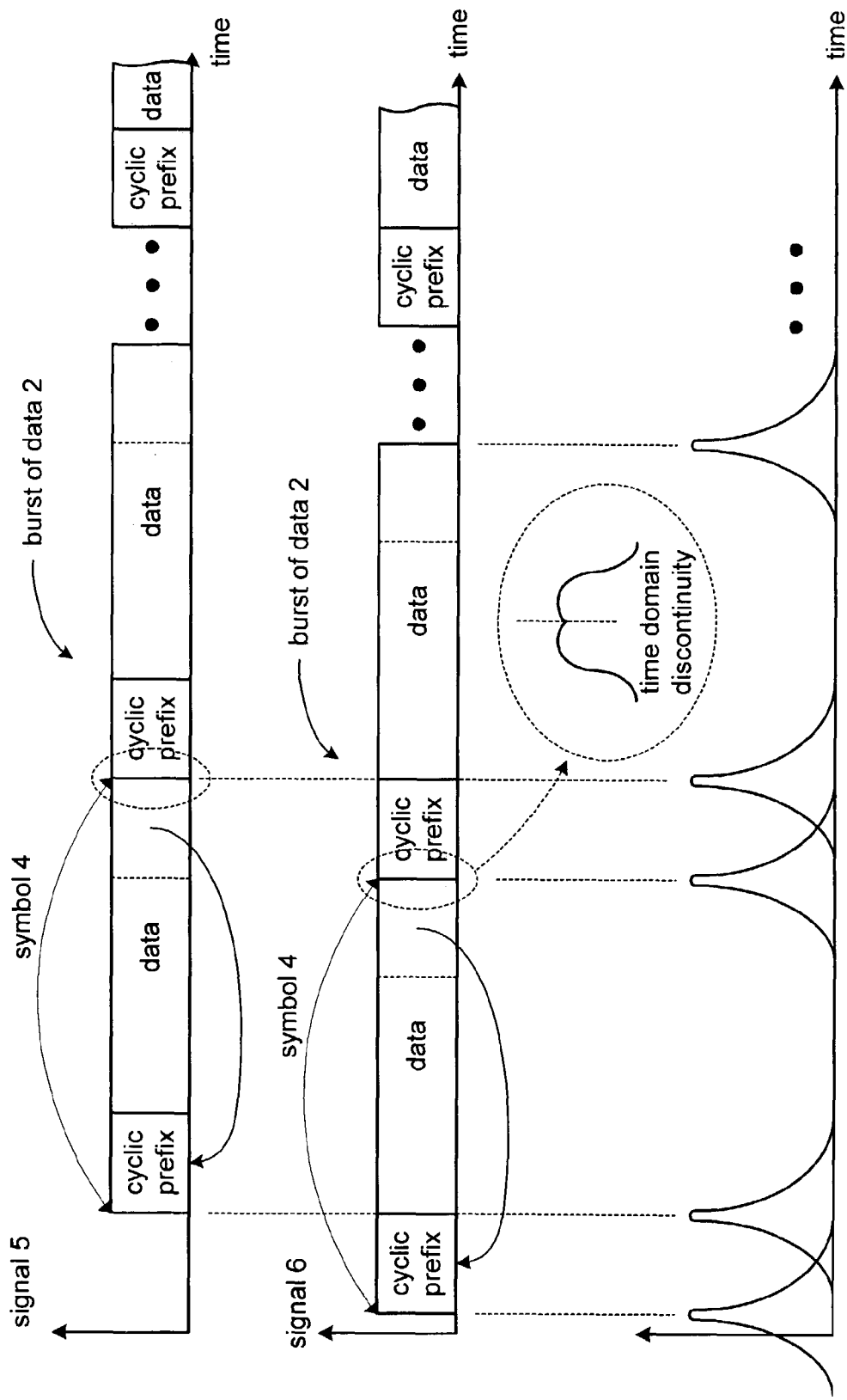
FIG. 2 is a time domain representation of bursts of data for two channels and corresponding noise in accordance with the present invention.
Figure 3:
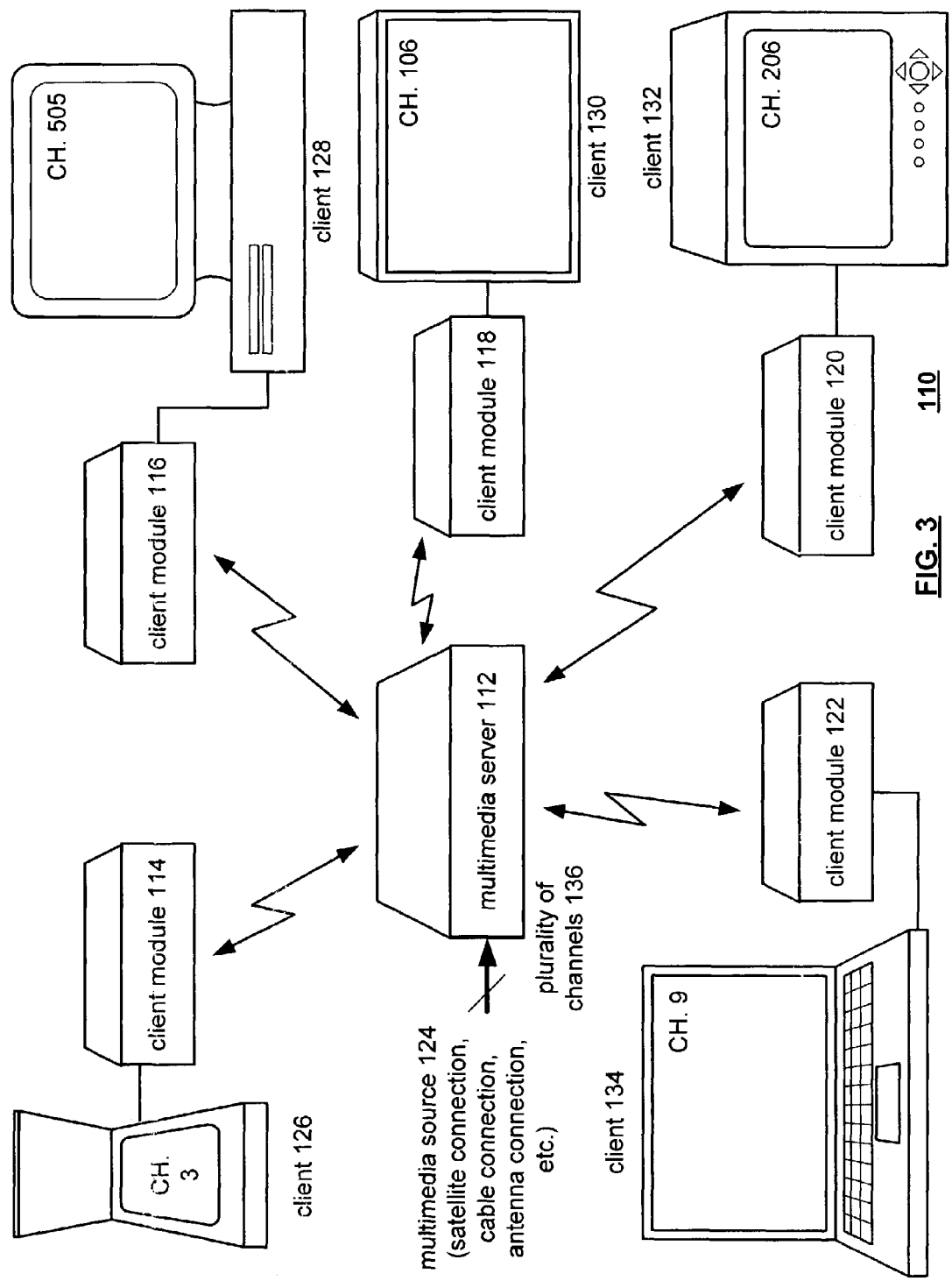
FIG. 3 illustrates a schematic block diagram of a multimedia system in accordance with the present invention.

The present invention can be more fully described with reference to FIGS. 3 through 14. FIG. 3 illustrates a multimedia system 110 that includes a multimedia server 112 and a plurality of client modules 114-122 operably coupled to a plurality of clients 126-134. Multimedia server 112 can include an embodiment of the multi-channel transmitter of this invention and can be considered analogous, for example, to a network base station, access point or router. Multimedia server 112 can further implement an embodiment of the method for synchronized channel transmission, of this invention. The multimedia server 112 is operably coupled to receive a plurality of channels 136 from a multimedia source 124. The multimedia source 124 may be a satellite connection, cable connection, antenna connection for NTSC television broadcast, HDTV broadcast, PAL broadcast, et cetera. As one of average skill in the art will appreciate, the multimedia server 112 may be a stand-alone device, may be incorporated in a satellite receiver, set-top box, cable box, HDTV tuner, home entertainment receiver, et cetera. In addition, the multimedia server 112 may be implemented using discrete components, integrated circuits, and/or a combination thereof.

The multimedia server 112 communicates with the plurality of client modules 114-122 via a communication path, which may be a radio frequency communication path, a wire line connection, an infrared connection, and/or any other means for conveying data. As such, the multimedia server 112 and each of the client modules 114-122 include a receiver and/or transmitter operable to convey data via the given type of communication path. This transmitter can be a multi-channel transmitter implementing a method for synchronized channel transmission in accordance with the teachings of this invention.

As shown, each client module is operably coupled to one of the clients. For example, client module 114 is operably coupled to client 126, which is representative of a personal digital assistant. Client module 116 is operably coupled to client 128, which is representative of a personal computer. Client module 118 is operably coupled to client 130, which is representative of a monitor (e.g., LCD monitor, flat panel monitor, CRT monitor, et cetera). Such a monitor may include speakers, or a speaker connection, control functions including channel select, volume control, picture quality, et cetera. Client module 120 is operably coupled to client 132, which may be a television set, high definition television (HDTV), standard definition television (SDTV), a home theatre system, et cetera. Client module 122 is operably coupled to client 134, which is representative of a laptop computer.

As one of average skill in the art will appreciate, the client module 114-122 may be a separate device from its associated client or embedded within the client. In addition, one of average skill in the art will further appreciate that the client modules 114-122 may be implemented utilizing discrete components and/or integrated circuits.

Each of the clients 126-134, via its associated client module 114-122, selects one or more channels from the plurality of channels 136. As shown, client 126 has selected channel 3 of the plurality of channels for viewing. Accordingly, client module 114 relays the channel selection of channel 3 to the multimedia server 112. The multimedia server 112 selects channel 3 from the plurality of channels 136. The data corresponding to channel 3 is then multiplexed with the data for the other channels and transmitted from the multimedia server 112 to each of the client modules 114-122. Client module 114 monitors the transmission from the multimedia server 112 and extracts the data corresponding to channel 3. The extracted data for channel 3 is then provided to the client 126 for display.

Client modules 116, 118, 120 and 122 perform a similar function for their associated clients 128, 130, 132 and 134, respectively. As shown, client 128 has selected channel 505, client 130 has selected channel 106, client 132 has selected channel 206 and client 134 has selected channel 9. Each of client modules 116-122 provides the channel selection of its respective client 128-134 to the multimedia server 112. Multimedia server 112 extracts the selected channels from the plurality of channels for each selection request, and multiplexes the data for each of the selected channels (for this example channel 3, 9, 106, 206 and 505) into a stream of data. The stream of data is then transmitted to each of the client modules, for example, along multiple individual channels. Each client module extracts the appropriate data of the selected channel for its respective client. For example, client module 116 monitors the transmitted data for data related to channel 505, client module 118 monitors for data related to channel 106, client module 120 monitors the transmission for data related to channel 206 and client module 122 monitors the transmission for data related to channel 9.

From each client's prospective, the client 126-34 has independent access to the multimedia source 124. Accordingly, client 126 may at any time change its channel selection from, for example, channel 3 to channel 120. The client module 114 provides the channel selection request to the multimedia server 112, which now retrieves data related to channel 120 for client 126 as opposed to channel 3. Similarly, clients 128-134 could also change their channel selection from the illustrated selection to another channel. Note that if two clients have selected the same channel, for example, client 126 and 128 both have selected channel 3, the multimedia server 112 would only extract data for channel 3 once and place in the header information of the data relating to channel 3 the identity of both client module 114 and 116. As such, client module 114 and 116 would extract the same data from the transmission by the multimedia server 112 and provide it to their respective clients.

Figure 4:
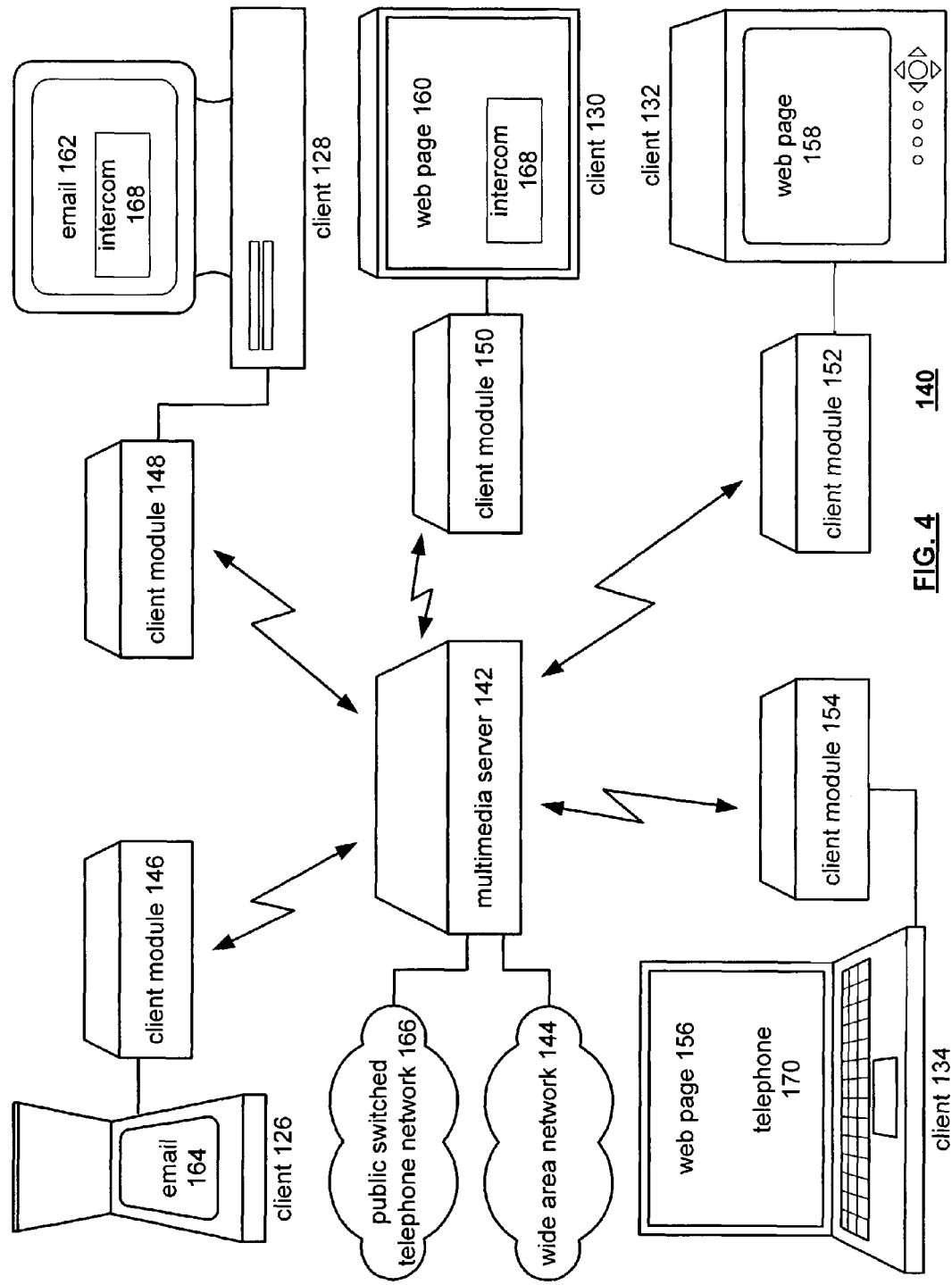
FIG. 4 illustrates a schematic block diagram of another multimedia communication system in accordance with the present invention.

FIG. 4 illustrates a schematic block diagram of a multimedia system 140 that includes a multimedia server 142, a plurality of client modules 146-154, and a plurality of clients 126-134. The multimedia server 142 is operably coupled to a wide area network (WAN) 144 and/or to a public switch telephone network (PSTN) 166. The wide area network 144 may be, for example, the Internet. The multimedia server 142 may be a stand-alone device or incorporated within a modem or within one of the clients 126-134. The functionality of multimedia server 142 may be implemented utilizing discrete components and/or integrated circuits with accompanying software and is analogous to the functionality of multimedia server 112.

The plurality of client modules 146-154 communicates with the multimedia server 142 via a communication path. The communication path may be a radio frequency communication path, infrared communication path, and/or wire line communication path. In this system 140, the multimedia server 142 is providing independent access for each of the clients 126-134 to the public switch telephone network 166 and/or to the wide area network 144.

For access to the public switch telephone network 166, each client 126-134 includes an identification code (e.g., a telephone number). The multimedia server 142 includes cordless telephone functionality such that the multimedia server 142 acts as a base station while each of the client modules 146-154 in conjunction with its respective client 126-134 functions as a handset. As such, for typical telephone communications, the multimedia server 142 is a single base station that includes a plurality of handsets, i.e., the clients 126-134 and their associated client modules 146-154. Note that if the multimedia server 142 has multiple connections to the public switch telephone network 166, multiple clients may have simultaneous telephone conversations ongoing. In addition, the multimedia server 142 may include private branch exchange (PBX) functionality such that communications between each client may occur within the system. For example, client 126 may communicate with client 134 via the multimedia server 142. As is the case for multimedia server 112, multimedia server 142 can comprise a multi-channel transmitter implementing a method for synchronized channel transmission in accordance with the teachings of this invention.

For accessing the wide area network 144, multimedia server 142 includes a network connection, which may be a DSL modem, cable modem, 56K modem, ISDN modem, etc. In addition, the multimedia server 142 includes a plurality of network access applications (e.g., web browser applications, email applications, et cetera) to facilitate each client's access to the wide area network 144. In operation, the client modules 146-154, for their respective clients 126-134, provide an indication that their client desires access to the wide area network 144. Upon receiving the wide area network request, the multimedia server 142 opens a network access application (email or web browser) for the respective client based on the request. The multimedia server 142 may have multiple network access applications open for each client 126-134. When this occurs, the multimedia server 142 allocates access to the network connection amongst the clients in a predetermined manner. For example, the multimedia server 142 may utilize a token passing concept to provide access to the network connection for each of the clients.

The multimedia server 142 receives data from the wide area network 144 which is destined for one or more of the clients 126-134. The multimedia server 142 provides the data to the plurality of client modules 146-154 along a single transmission stream or along multiple simultaneous and synchronized transmission streams. Each of the client modules monitors the transmissions from the multimedia server 142 to extract data for its respective client 126-34. For example, upon detecting data for its client, the client module 146 extracts the data and subsequently provides it to its client.

In this illustration, clients 130-134 are accessing the Internet and are thus using a web application. For instance, client 134 has web page 156 open, client 132 has web page 158 open, and client 130 has web page 160 open. Each of these web pages appear to the respective client as if the client has direct and independent access to the wide area network. As is also shown, clients 126 and 128 have opened an email application 164 and 162, respectively. As such, client 126 and 128 may process their email via the multimedia server 142.

Figure 5:
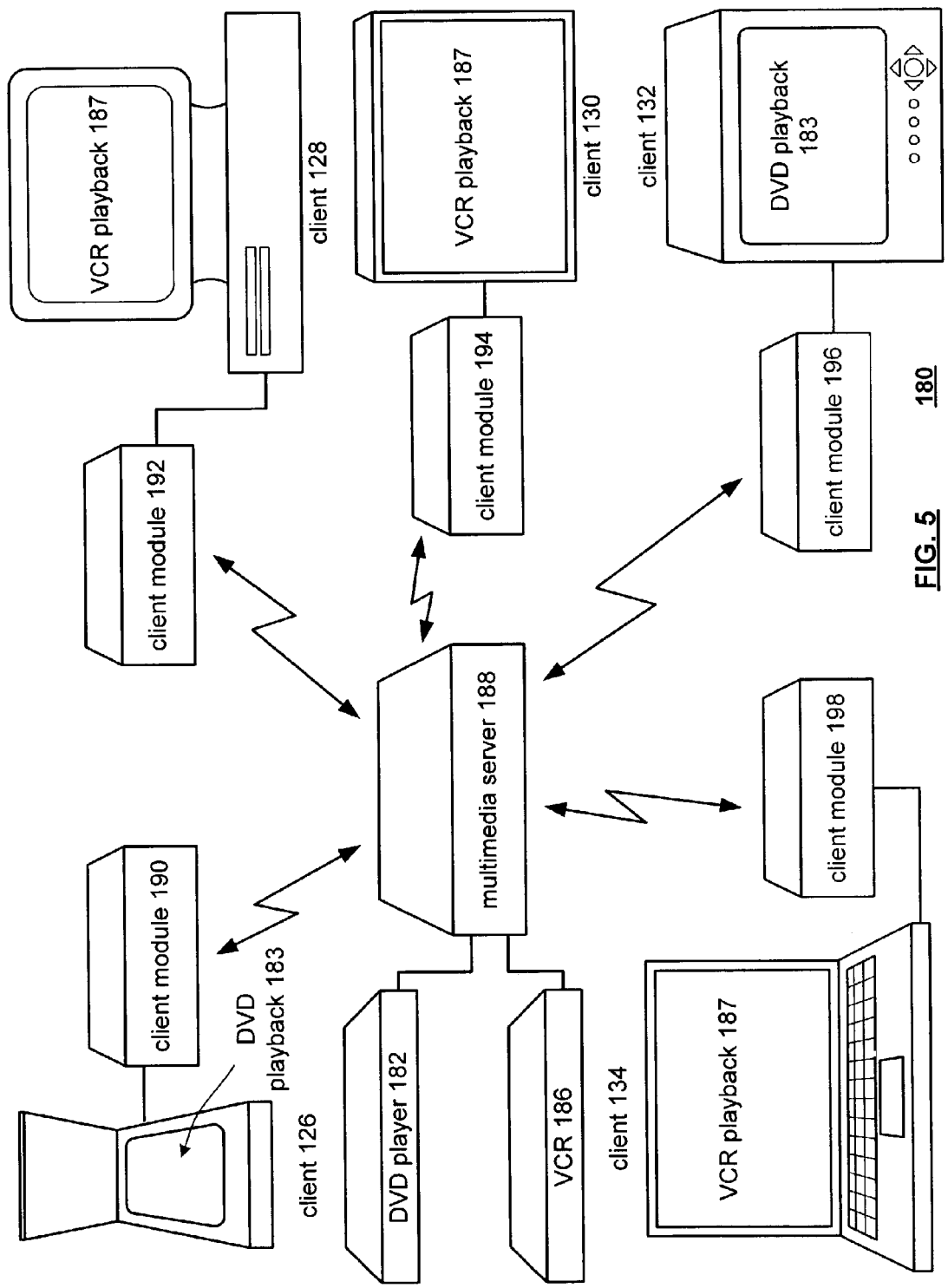
FIG. 5 illustrates a schematic block diagram of a further multimedia communication system in accordance with the present invention.

FIG. 5 illustrates a schematic block diagram of a multimedia system 180 that includes a multimedia server 188, a plurality of client modules 190-198, a plurality of clients 126-134, a DVD player 182, a VCR 186, and other such playback devices. Other such playback devices include laser-disk players, digital VCRs, close circuit televisions, camcorders, et cetera. In this system 180, the multimedia server 188 provides access to the playback equipment devices, e.g., DVD player 182 and VCR 186, for each of the plurality of clients. Each client may select to receive a DVD playback, a VCR playback, or playback from any one of the other video sources. As is the case for multimedia server 112, multimedia server 188 can comprise a multi-channel transmitter implementing a method for synchronized channel transmission in accordance with the teachings of this invention. The functionality of multimedia server 188 may be implemented utilizing discrete components and/or integrated circuits with accompanying software and is analogous to the functionality of multimedia server 112.

In this illustration, client 126 has selected DVD playback 183. Accordingly, client 126 provides an indication of its selection to client module 190. Client module 190 communicates client 126's selection to the multimedia server 188. The multimedia server 188 processes the selection to provide the playback data to client module 190. As further shown in FIG. 5, client 132 has also selected DVD playback 183, while clients 128, 130 and 134 have selected VCR playback 187. As such, each of the associated client modules 192-198 will provide its clients' selection to the multimedia server 188.

The multimedia server 188 processes the selections to produce a stream of outgoing data. In this example, the stream of outgoing data includes the DVD playback 183 data and the VCR playback 187 data. Accordingly, the transmission provided by multimedia server 188 to the client modules 190-198 identifies which packets and/or frames contain DVD playback data and which frames and/or packets contain VCR playback data. For example, the multimedia server 188 may tag packets as containing DVD playback data or VCR playback data. Alternatively, the multimedia server 188 may tag the packets by including the identity of the particular client module associated with the client that provided the specific VCR or DVD playback request. In either case, the client modules 190-198 interpret the data transmitted from the multimedia server 188 to extract the appropriate data for its client. The extracted data is then provided to its client for playback. Each client module, in any embodiment of the present invention, can include a separate channel for reception corresponding to a unique transmission channel of multimedia server 188 (or multimedia servers 112 and 142, or any other multimedia server discussed herein). Different client modules may also share one or more of the same reception/transmission channels, which can include multiplexed data tagged for specific client modules.

As one of average skill in the art will appreciate, the multimedia server 188 may be operably coupled to the client modules 190-198 via an RF connection, infrared connection and/or a wire line connection, or a combination thereof. In addition, each of the client modules 190-198 may be separate devices and/or included within its respective client. As one of average skill in the art will further appreciate, the client modules 190-192 may be implemented in discrete circuit components and/or integrated circuits and further include associated programming operations. Similarly, multimedia server 188 may be a stand-alone device or incorporated within the DVD player 182, VCR 186, and/or any other video source. The multimedia server 188 may be implemented utilizing discrete components, integrated circuits and associated programming operations.

Figure 6:
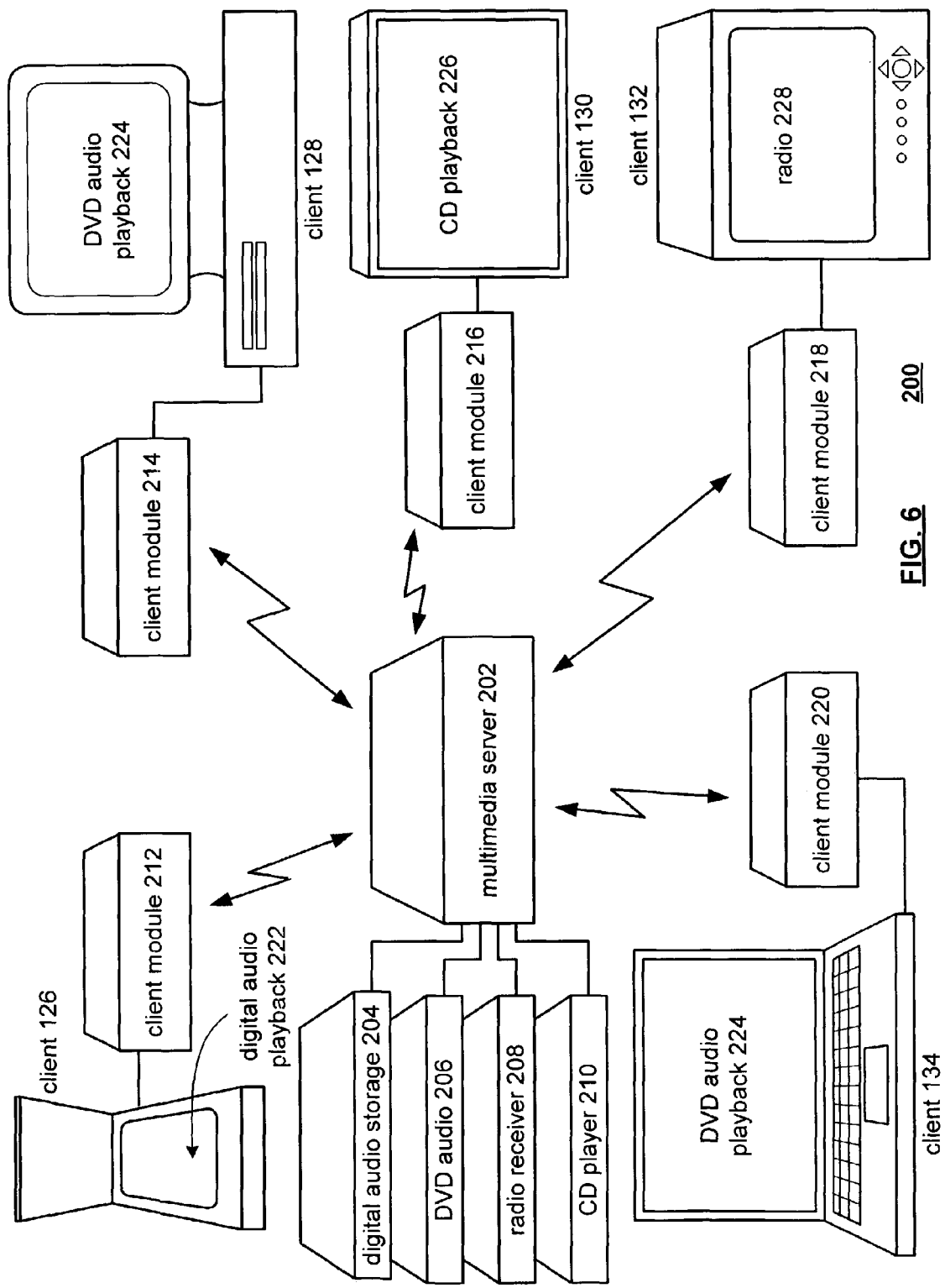
FIG. 6 illustrates a schematic block diagram of yet another multimedia communication system in accordance with the present invention.

FIG. 6 illustrates a schematic block diagram of a multimedia system 200 that includes a multimedia server 202, a plurality of client modules 212-220, a plurality of clients 126-134, a digital audio storage device 204, a DVD audio device 206, a radio receiver 208, and a CD player 210. In this illustration, the multimedia system 200 provides a selection of multiple audio sources to a plurality of clients without requiring an independent and direct connection to each of the audio devices.

In operation, the client modules 212-220 receive a selection request from their respective clients. The selection request selects audio playback from the digital audio storage device 204, which may be storing MP3 files, digitized audio, et cetera, the DVD audio player 206, the radio receiver 208, the CD player 210, and/or any other type of audio source.

Upon receiving the selection request, the multimedia server 202 processes the request to authenticate it and, once authenticated, retrieves data from the appropriate audio source 204-210. The multimedia server 202 provides the audio data from the audio sources 204-210 along a single transmission stream or along multiple simultaneous and synchronized transmission streams to client modules 212-220. Each of the client modules 212-220 receives the transmission and extracts the relevant portions for its client. As is the case for multimedia server 112, multimedia server 202 can comprise a multi-channel transmitter implementing a method for synchronized channel transmission in accordance with the teachings of this invention. The functionality of multimedia server 202 may be implemented utilizing discrete components and/or integrated circuits with accompanying software and is analogous to the functionality of multimedia server 112.

As shown in FIG. 6, client 126 has selected to display audio from the digital audio storage device 204. Accordingly, the client 126 provides the selection request to client module 212, which is subsequently provided to the multimedia server 202. The multimedia server 202 processes the request and initiates the playback from the digital audio storage device 204. The audio playback data from the storage device 204 is received by the multimedia server 202, which provides it, along with other audio playback data from other audio sources, to the client modules. The transmission from the multimedia server 202 may be in packets and/or frames. Each packet and/or frame includes a header section that identifies the source of the data and/or the destination of the data. Accordingly, client module 212 monitors the transmission or transmissions for data addressing it and/or identifying the digital audio storage device 204. Upon detecting such data within the transmission(s), the client module 212 extracts the data and provides it to the client 126 for digital audio playback 222. Similar functionality is provided for the other clients and client modules.

Figure 7:
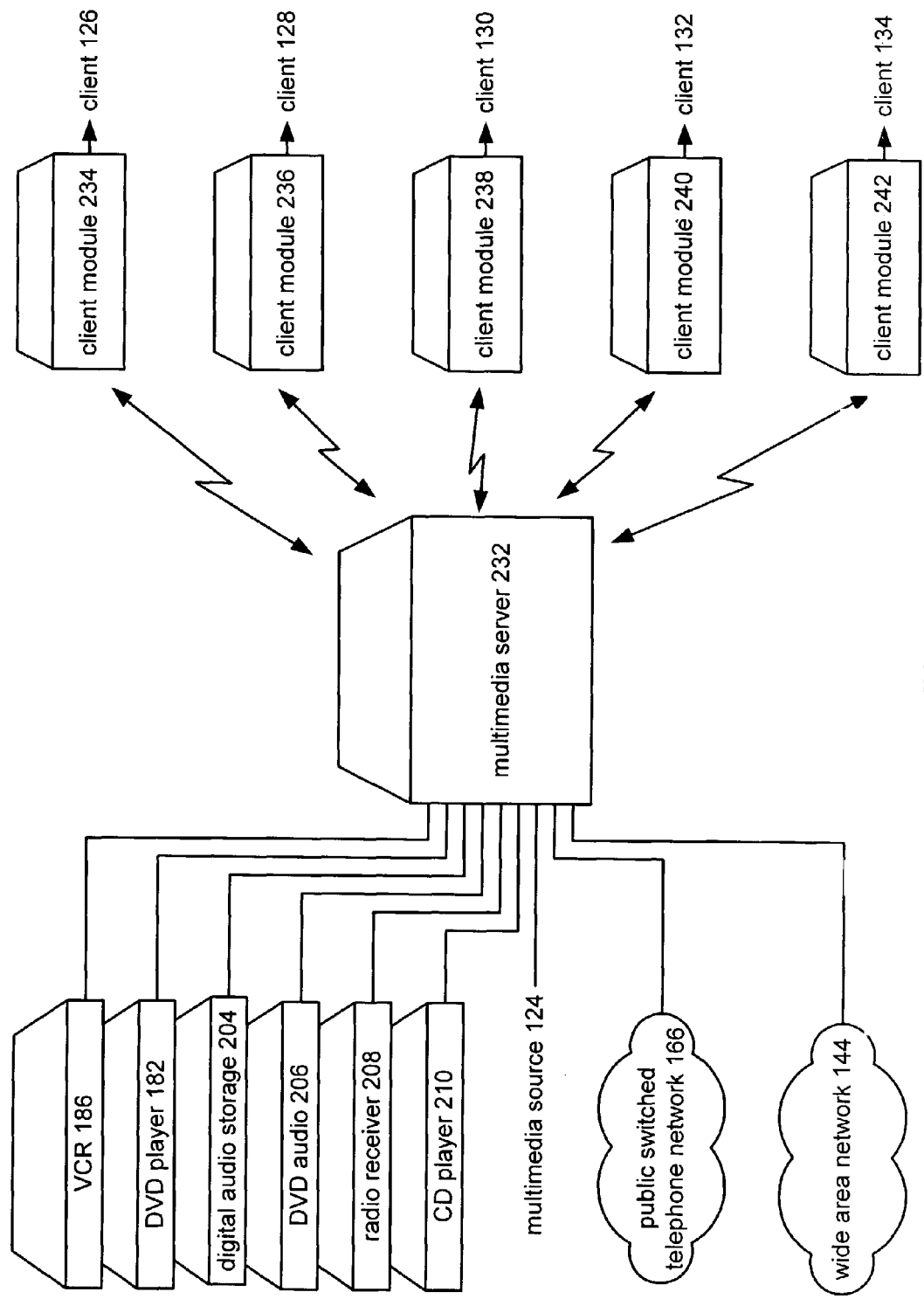
FIG. 7 illustrates a schematic block diagram of a still further multimedia communication system in accordance with the present invention.

FIG. 7 illustrates a schematic block diagram of a multimedia system 230 that includes multimedia server 232, client modules 234-242, clients 126-134, and a plurality of multimedia sources. The multimedia sources include VCR 186, DVD player 182, digital audio storage device 204, DVD audio 206, radio receiver 208, CD player 210, multimedia source 124, public switch telephone network 166, wide area network 144, and/or any other type of audio and/or video source. In this system 230, the clients 126-134 may select playback from, and/or connection to, any one of the multimedia sources. The selection request from each client module would identify the desired multimedia source, the client, the desired service and any other information to assist the multimedia server 232 in processing the request. As such, one client may be accessing the Internet, while another client is watching a satellite broadcast channel, while another is listening to a CD playback, while another is talking on the telephone, and yet another is watching a DVD playback. This is all done via the multimedia server 232 without requiring the clients to have direct access to the multimedia sources and without the requirement that each client have its own multimedia source and/or multimedia source connection. In essence, multimedia server 232 provides the functionality of one or more of multimedia servers 112, 142, 188 and 202 of FIGS. 2-5 in accordance with the teachings of this invention. Client modules 234-242 provide the functionality of one or more of the client modules described generally with reference to FIGS. 3-6.

As one of average skill in the art will appreciate, the multimedia server 112, 142, 188, 202, and/or 232 may be incorporated in a home theatre receiver, television set, modem, set-top box, cable receiver, satellite receiver, VCR, DVD player, et cetera to provide the networking functionality as generally described in FIGS. 3-7. As one of average skill in the art will further appreciate, the clients 126-134 of FIGS. 3-7 may be any one of a personal computer, a laptop computer, a personal digital system, a video telephone, a digital telephone, a cellular telephone, a monitor, a television, a high definition television, a printer, a facsimile machine, and/or any devices that includes an audio and/or video display.

Figure 8:
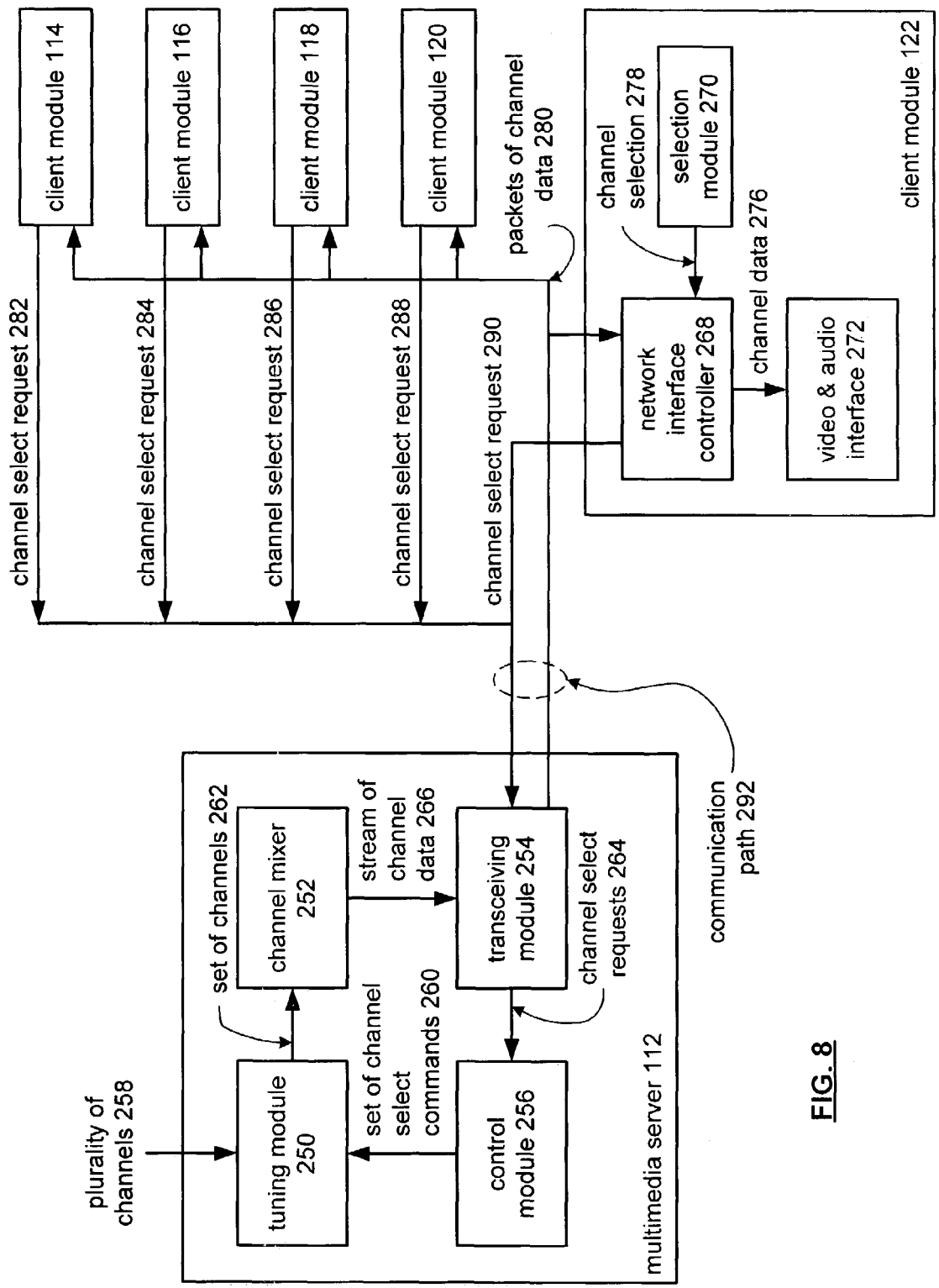
FIG. 8 illustrates a schematic block diagram of a multimedia server and client modules of the multimedia communication system illustrated in FIG. 3.

FIG. 8 illustrates a schematic block diagram of the multimedia server 112 and client modules 114-122 of the system 110 of FIG. 3. The multimedia server 112 includes a tuning module 250, a channel mixer 252, a transceiving module 254, and a control module 256. The multimedia server 112 is operably coupled to each of the client modules 114-122 via a communication path 292. The communication path 292 may be a wire line connection, a transmit wire line connection, a receive wire line connection, a transceiving radio frequency path, a transmit radio frequency path, a receive radio frequency path, a transceiving infrared path, a transmitting infrared path, and/or a receiving infrared path. For purposes of the embodiments of the method and apparatus for synchronized channel transmission of this invention, communication path 202 is an RF communication path. Communication path 292 can comprise a plurality of different channels for transmission of data from transceiving module 254. Transceiving module 254 can further comprise a plurality of different antennas, corresponding to the plurality of different channels, for transmission of data along communications path 292.

The transceiving module 254 receives channel select requests 282-290 from the plurality of client modules 114-122 via the communication path 292. The transceiving module 254 extracts the physical layer information from the requests 282-290 to retrieve the respective channel select requests 264. The transceiving module 254 provides the channel select request 264 to control module 256. As an analogy, note that the channel selections 278 may correspond to network layer data while the channel selection request 282-290 may correspond to physical layer data of a ISO standardized communication system. As such, a channel selection request 264 utilizes physical layer type identification within its header and includes in its data section the channel selections 278. The channel selections 278 include a header section and data section corresponding to the particular channel selected.

The control module 256 processes the channel select request 264. The processing of the channel select requests 264 includes authenticating the request and preparing a set of channel selection commands 260 therefrom. The tuning module 250 receives the set of channel selection commands 260 and extracts a set of channels 262 from a plurality of channels 258 based on the set of channel selection commands 260. The plurality of channels 258 correspond to channels provided via a satellite connection, a cable connection, an NTSC broadcast, an HDTV broadcast, a PAL broadcast, et cetera. The tuning module 250 provides data for each of the channels of the set of channels 262 to the channel mixer 252.

The channel mixer 252 mixes (i.e., multiplexes) the set of channels 262 to produce one or more streams of channel data 266. The mixing of the set of channels includes converting the data of each channel into a generic data type and then converting the generic data into a specific data format for transmission as a stream of channel data 266. Each stream of channel data 266 can correspond to a distinct transmission channel from multimedia server 112 along communication path 292.

The transceiving module 254 transmits each stream of channel data 266 in packets of channel data 280. Alternatively, the streams of channel data 266 may be transmitted in frames of channel data. Each of the client modules 114-122 receives the packets, or frames, of channel data 280 via its network interface controller 268 along one or more of the channels of communications path 292. The multimedia server 112 illustrated in FIG. 8 is but one possible implementation of an embodiment of the multi-channel transmitter and method for synchronized channel transmission of the present invention. Transceiving module 254, as discussed more fully below with reference to FIGS. 9-12, can comprise a multi-channel transmitter implementing a method for synchronized channel transmission in accordance with the teachings of this invention.

Figure 9:
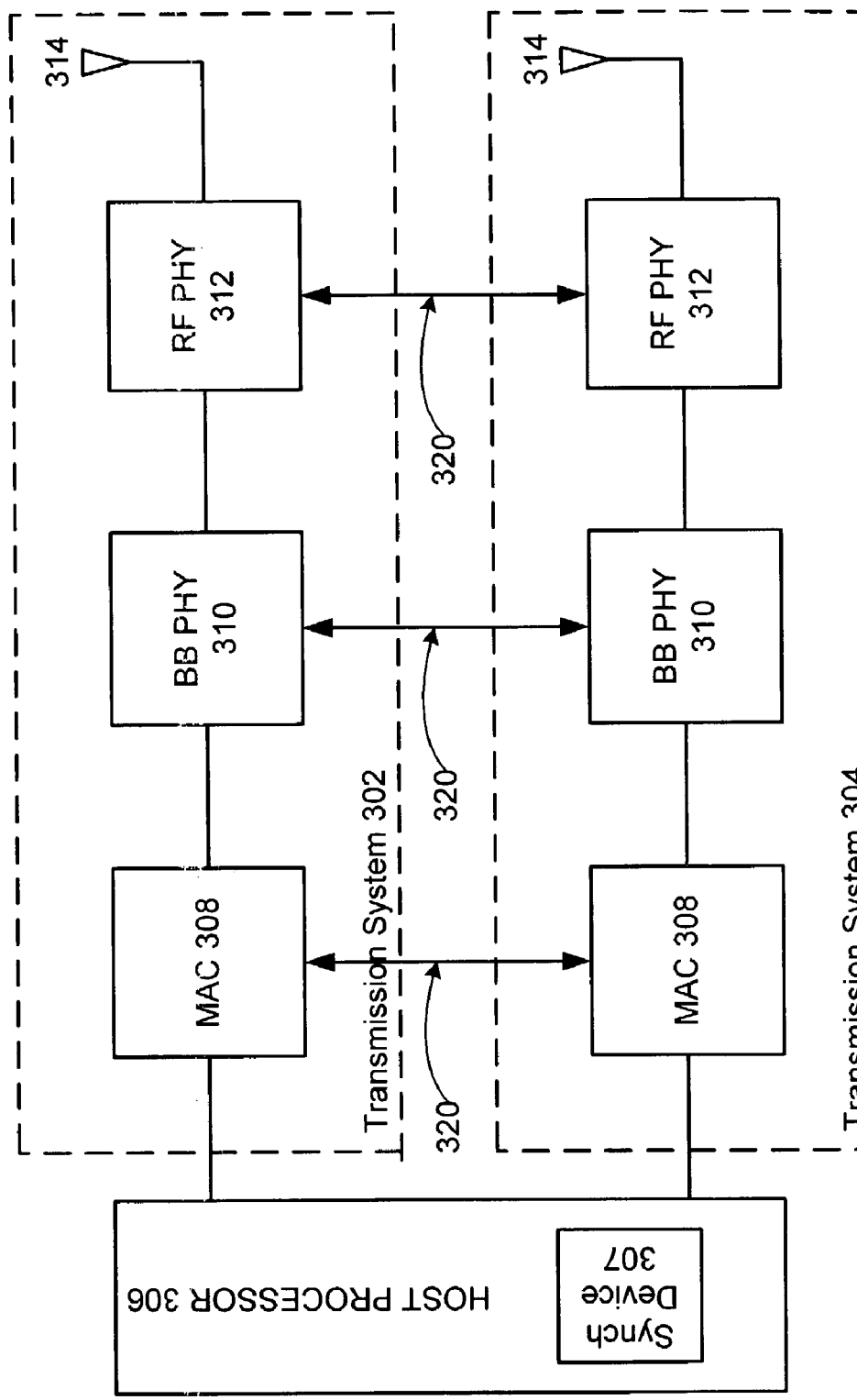
FIG. 9 illustrates a schematic block diagram of a multi-channel transmitter in accordance with this invention.

One embodiment of such a multi-channel transmitter in accordance with this invention is illustrated in FIG. 9. Multi-channel transmitter 300 comprises two distinct transmission systems 302 and 304 that share a host processor 306. Each transmission system 302 and 304 comprises a media access controller ("MAC") 308, a baseband physical layer ("BB PHY") module 310, an RF physical layer ("RF PHY") module 312 and an antenna 314. The host processor 306 is operably coupled to provide the raw data (e.g., stream of channel data 266), without processing, in the form of a data stream to each MAC 308. In the embodiment of FIG. 9, the method for synchronized channel transmission of this invention is implemented within host processor 306 as an algorithm within a synchronization device 307 for performing the functions of the method as described herein. The two transmission system channels in this embodiment are thus synchronized by the host processor 306 and provided as synchronized streams of data to the MACs 308. Synchronization of the channels within host processor 306 comprises synchronizing the starting point of the distinct data streams. The various embodiments of the method of this invention can all be implemented as an algorithm comprising computer executable software instructions stored within a memory storage device.

Each of the MACs 308 is operably coupled to packetize its respective data stream (partition the data into packets and format it according to the protocol in use by the transmitter system 302 or 304) to produce a plurality of data packets, which are then provided to their respective BB PHY module 310. Each MAC 308 can further encrypt its data stream and determine a modulation scheme for the data. For example, the modulation scheme can be orthogonal frequency-division multiplexing. In a multi-MAC embodiment, one MAC 308 can be a master MAC 308, and the other MAC(s) 308 can be slave MAC(s) responding to inputs from the master MAC 308. As shown in FIG. 9, multi-channel transmitter 300 can further comprise connections 320 between like modules to communicate synchronization and timing data.

Each BB PHY module 310 is operably coupled to baseband process its respective plurality of data packets to produce a plurality of symbols for each of its plurality of data packets. Such processing can comprise block processing of the received signals (data packets). Baseband processing a plurality of data packets can further comprise appending a cyclic redundancy code ("CRC"), for error correction purposes, and prepending header information to each data packet of the first and the second plurality of data packets. Each RF PHY module 312 is operably coupled to convert its respective plurality of symbols received from its corresponding BB PHY module 310 into a radio frequency signal. The radio frequency is an analog signal that is then transmitted from an antenna 314. The radio frequency signals transmitted from different antennas 314 are transmitted along distinct channels and can be transmitted contemporaneously without interfering with one another because the channels are synchronized in accordance with the teachings of this invention.

Synchronization device 307 implements the algorithm for synchronized channel transmission of this invention. In the embodiment illustrated in FIG. 9, the synchronization module 307 is incorporated within host processor 306. Synchronization device 307 can be incorporated, in different embodiments discussed more fully below with reference to FIGS. 9, 10A and 10B, within a MAC 308, a BB PHY module 310 or an RF PHY module 312 to perform the channel synchronization in accordance with this invention. Synchronization device 307 can thus be operably coupled to synchronize at least one of: generating the distinct data streams, packetizing the data streams, baseband processing the distinct pluralities of data packets, and converting the distinct pluralities of symbols.

Figure 10:
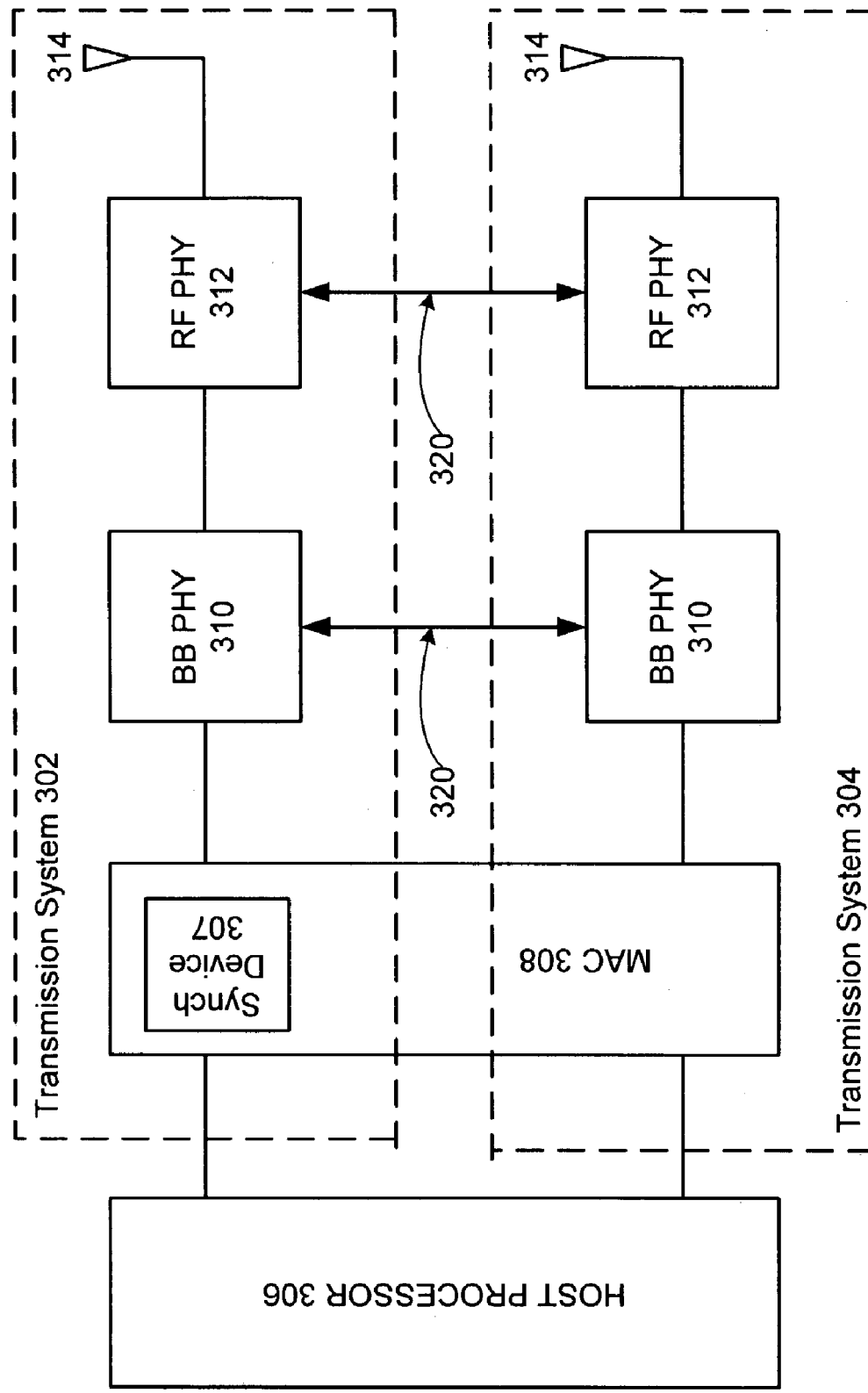
FIG. 10 illustrates a schematic block diagram of another multi-channel transmitter in accordance with this invention.

FIG. 10 is a schematic block diagram illustrating an embodiment of the multi-channel transmitter of this invention wherein the channel synchronization is performed by a MAC 308. In this embodiment (a two channel embodiment as in FIG. 9), multi-channel transmitter 322 comprises a single MAC 308. Two distinct data streams are generated by the single host processor 306 and then synchronized within the MAC 308. The MAC 308 synchronizes the packetizing of the data streams and provides two distinct signals, each comprising a plurality of data packets, one to each of two BB PHY modules 310. The operation of the embodiment of FIG. 10 is otherwise the same as the operation of the embodiment of FIG. 9.

Synchronizing packetizing of the distinct data streams within a MAC 308 can comprise synchronizing the transmission of a first packet in one plurality of data packets with the transmission of a first packet in the other plurality of data packets. Synchronizing the transmission of the first packets in each plurality of data packets can comprise delaying the transmission of either first packet to match the transmission time of the first packet of one channel with the transmission time of the first packet of the other channel. Alternatively, synchronizing packetizing of the distinct data streams within a MAC 308 can comprise synchronizing the transmission of each packet of one plurality of data packets with the transmission of a corresponding packet of the other plurality of data packets. A corresponding packet on one channel can be a closest-in-time packet to a packet on the other channel. Synchronizing the transmission of each packet in one data stream with a corresponding packet in another data stream can further comprise delaying, on a packet by packet basis, the transmission of either a packet on one data stream and/or the corresponding packet on the other data stream.

Figure 11A:
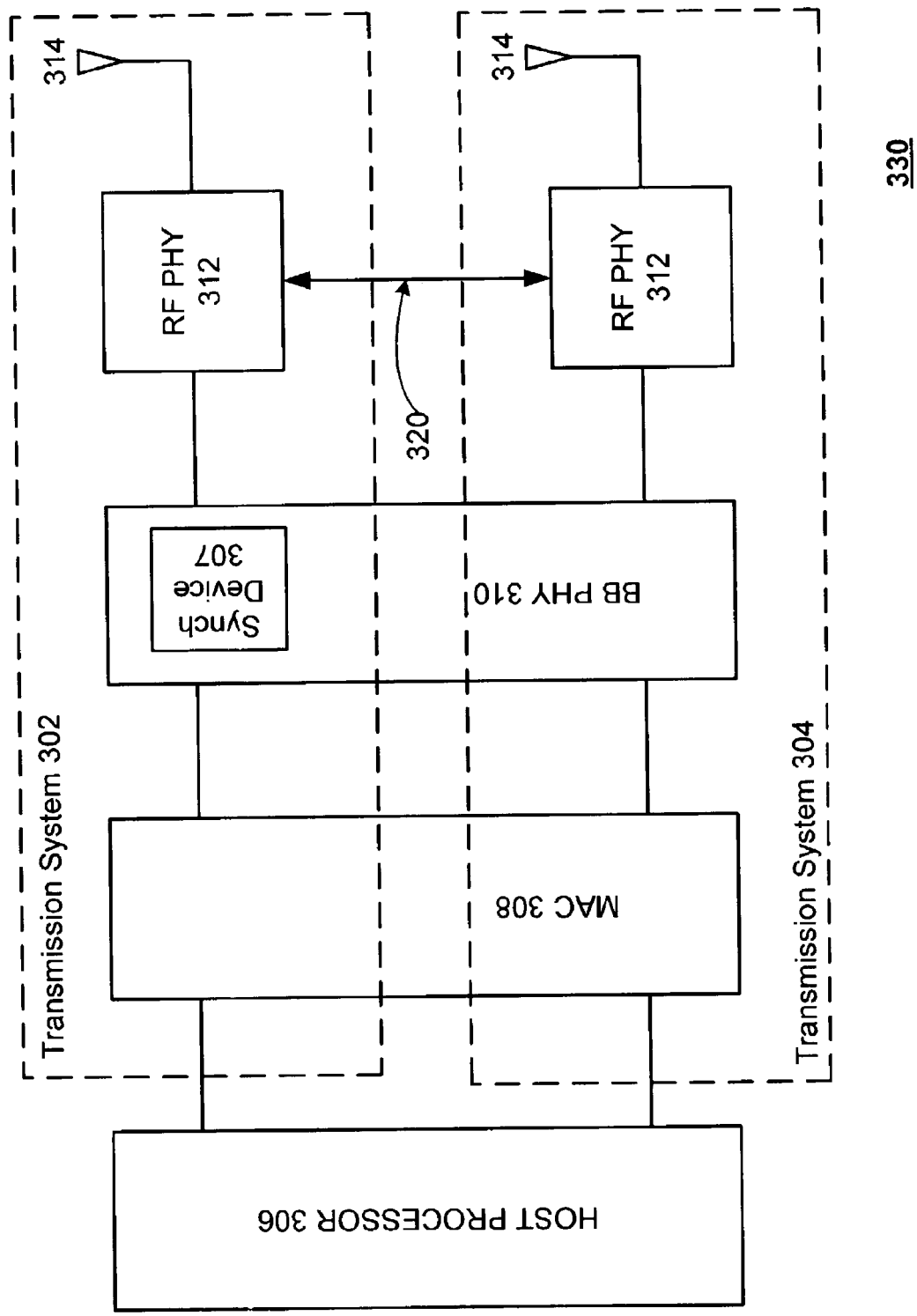
FIGS. 11A and 11B illustrate schematic block diagrams of still further multi-channel transmitters in accordance with this invention.
Figure 11B:
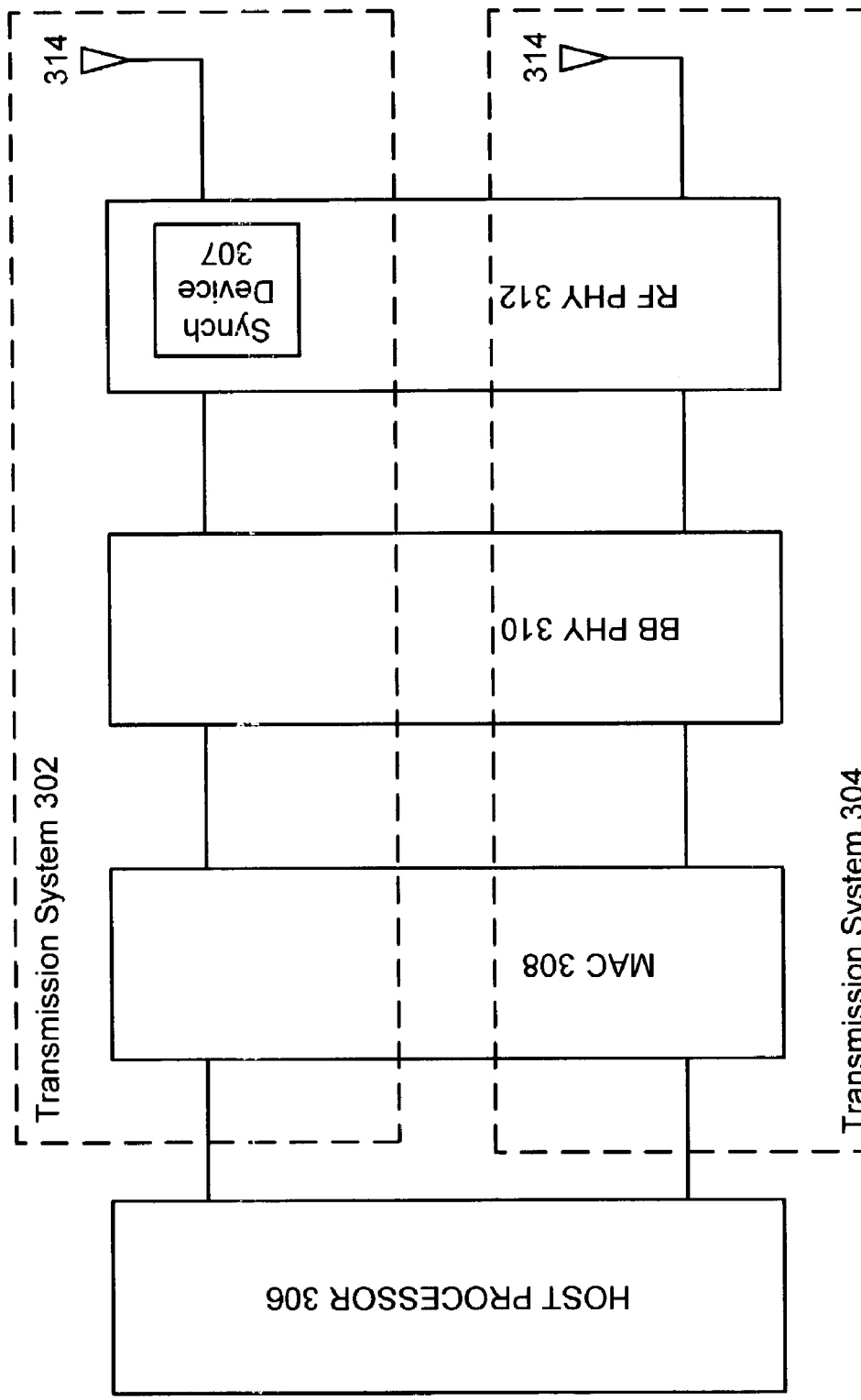

FIGS. 11A and 11B are schematic block diagrams illustrating embodiments of the multi-channel transmitter of this invention wherein the channel synchronization is performed at a BB PHY module 310 and at an RF PHY module, respectively. The BB PHY modules 310 and RF PHY modules 312, when incorporating the synchronization device 307, provide channel synchronization by synchronizing the symbol boundaries of the plurality of symbols along the distinct channels. Within a BB PHY module 310 of multi-channel transmitter 330 of FIG. 11A, synchronizing the baseband processing of the distinct pluralities of data packets comprises synchronizing a symbol boundary of one or more of the plurality of symbols on one channel with a symbol boundary of one or more of the plurality of symbols on the other channel. Synchronizing of the symbol boundaries can further comprise synchronizing a guard interval of one or more of the plurality of symbols on one channel with a guard interval of one or more of the plurality of symbols on the other channel.

Channel synchronization can also be performed within an RF PHY module 312 of a multi-channel transmitter 340, as in the embodiment illustrated in FIG. 11B. As shown, a single RF PHY module 312 receives, in this example, two distinct data channels comprising a first plurality of symbols and a second plurality of symbols. The RF PHY module 312 converts the first and second plurality of symbols into a first and second radio signal, respectively. The RF PHY module 312, via synchronizing device 307, synchronizes the channel transmission by synchronizing the converting of the first and second plurality of symbols. Synchronizing the converting of the first and second plurality of symbols comprises synchronizing a symbol boundary of one or more of the first plurality of symbols with a symbol boundary of one or more of the second plurality of symbols. Synchronizing of the symbol boundaries can further comprise synchronizing a guard interval of one or more of the first plurality of symbols with a guard interval of one or more of the second plurality of symbols, as in the embodiment of FIG. 11B. The operation of the like components of FIGS. 9-11B are otherwise the same, and the embodiments illustrated by these Figures perform the steps of the method of this invention for synchronizing channel transmissions.

Figure 12:
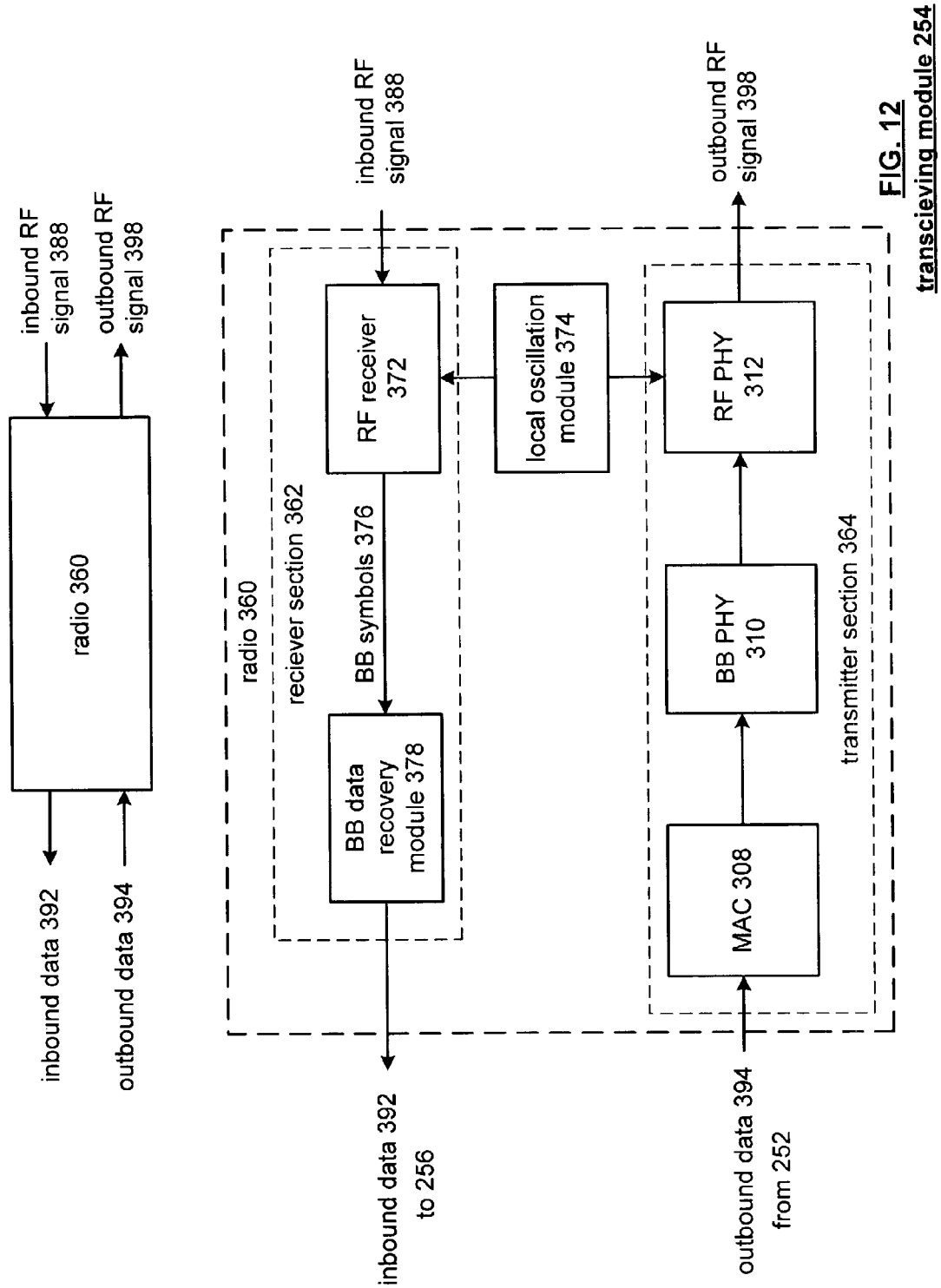
FIG. 12 is a schematic block diagram illustrating in more detail one embodiment of transceiving module 254 of FIG. 8 in accordance with this invention.

FIG. 12 is a schematic block diagram illustrating in more detail one embodiment of transceiving module 254 of FIG. 8. In this embodiment, transceiving module 254 comprises at least two radios 360 for transmitting along two distinct channels. Each radio 360 includes a receiver section 362 and a transmitter section 364. The receiver section 362 includes a RF receiver 372 and a baseband data recovery module 378. The RF receiver 372 receives inbound RF signals 388 and converts them, based on a local oscillation provided by the local oscillation module 374, to produce baseband symbols 376. The BB data recovery module 378 processes the BB symbols 376 to produce inbound data 392, which is provided to the control module 256.

The transmitter section 364 includes MAC 308, BB PHY 310, and RF PHY 312 to convert outbound data 394 into outbound RF signals 398. The transmitter section 364 of one of the radios may be coupled to the transmitter section of the other radio as illustrated in FIGS. 9-11B to provide the synchronization of transmissions, where the host module is included in the control module 256, the channel mixer 252, and/or the tuning module 250 of the multimedia server 112 as shown in FIG. 8.

In the RF implementation of transceiving module 254, the particular RF frequencies of the inbound and outbound RF signals 388 and 398 are dictated by governmental agencies, such as the Federal Communications Commission (FCC). Typically, such in-home frequencies range from the hundreds of megahertz to single digit gigahertz frequency ranges. One particular type of RF in-home application of interest is dictated by ITC specification 802.11a. The 802.11a specification provides the operating parameters for using radio frequencies for transceiving data within homes and/or over short distances.

As one of average skill in the art will appreciate, the communication path 292 between the multimedia server and the plurality of clients may comprise one or more of a wire line communication path, an RF communication path, and an IR communication path. For example, the transmitting path between each of the client modules may utilize the RF communication path while the receiving path may be an IR path. As a farther example, the client modules within the same physical location as the server may be operably coupled via a wire line communication path while other client modules in different locations within a home utilize an RF communication path. Thus, a variety of communication path combinations may be utilized within the same multimedia communication system to provide the multimedia communication services.

Figure 13:
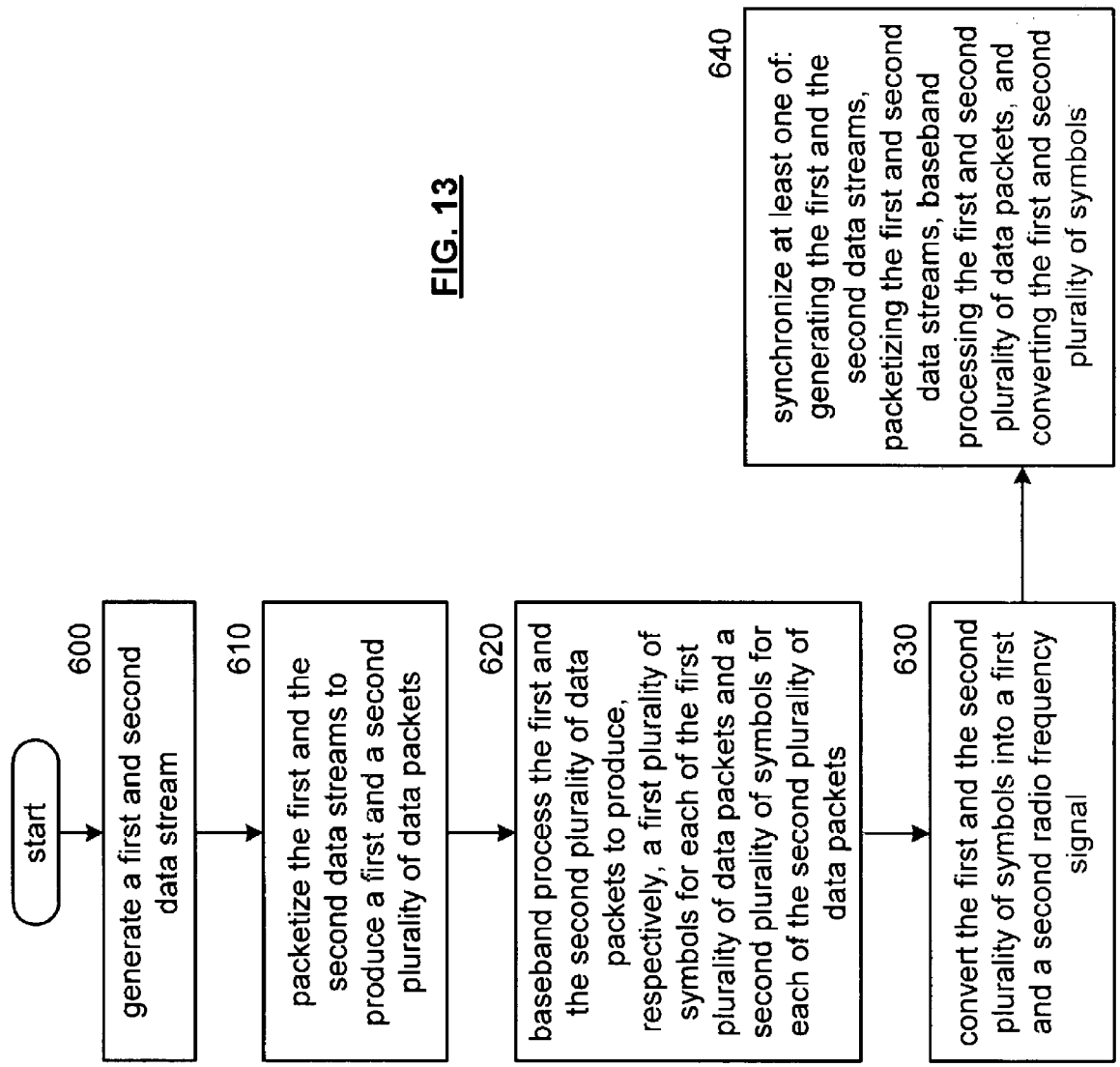
FIG. 13 is a logic diagram illustrating an embodiment of the method for synchronized channel transmission in accordance with this invention.

FIG. 13 is a logic diagram illustrating an embodiment of the method for synchronized channel transmission of this invention. The method may be performed by any of the multimedia servers, or multi-channel transmitters, illustrated and described herein with respect to the previous Figures. At step 600 of the method, a first data stream and a second data stream are generated. At step 610, the first data stream and the second data stream are packetized to produce a first plurality of data packets and a second plurality of data packets, respectively. At step 620, the first and second plurality of data packets are baseband processed to produce, respectively, a first plurality of symbols for each of the first plurality of data packets and a second plurality of symbols for each of the second plurality of data packets.

The method then proceeds to step 630, by converting the first and second plurality of symbols into a first radio frequency signal and a second radio frequency signal, respectively. At step 640, the method synchronizes at least one of: generating the first and the second data streams, packetizing the first and second data streams, baseband processing the first and second plurality of data packets, and converting the first and second plurality of symbols. Synchronizing the baseband processing of the first and second plurality of data packets and synchronizing the converting of the first and second plurality of symbols, in one embodiment, comprises synchronizing a symbol boundary of one or more of the first plurality of symbols with a symbol boundary of one or more of the second plurality of symbols. Synchronizing the symbol boundary of one or more of the first plurality of symbols with the symbol boundary of one or more of the second plurality of symbols further comprises synchronizing a guard interval of one or more of the first plurality of symbols with a guard interval of one or more of the second plurality of symbols.

Synchronizing the packetizing of the first and second data streams in the embodiments of the method of this invention can further comprise synchronizing the transmission of a first packet of the first plurality of data packets with the transmission of a first packet of the second plurality of data packets. Synchronizing the transmission of the first packet of the first plurality of data packets with the transmission of the first packet of the second plurality of data packets can in turn comprise delaying the transmission of one of: the first packet of the first plurality of data packets, and the first packet of the second plurality of data packets. Alternatively, synchronizing the packetizing of the first and second data streams can comprise synchronizing the transmission of each packet of the first plurality of data packets with the transmission of a corresponding packet of the second plurality of data packets. The corresponding packet can be a closest-in-time packet of the second plurality of data packets to each of the packets of the first plurality of data packets. Further, synchronizing the transmission of each packet of the first plurality of data packets with the transmission of a corresponding packet of the second plurality of data packets can comprise delaying, on a packet by packet basis, the transmission of one of: each packet of the first plurality of data packets, and the corresponding packet of the second plurality of data packets.

The method of the present invention can further comprise encrypting the first and the second data streams and/or modulating the first and the second data streams according to a preset modulation scheme. The modulation scheme can be orthogonal frequency-division multiplexing. Baseband processing the first and the second plurality of data packets can further comprise appending a cyclic redundancy code ("CRC") and prepending a header to each data packet of the first and the second plurality of data packets. Additionally, synchronizing generating the first and second data streams can be accomplished by synchronizing the start of each of the first and the second data streams.

The embodiments of the method of this invention can be implemented within transceiving module 254 of multimedia server 112 or within any other multi-channel transmitter in which synchronization of channels is desired. As one of average skill in the art will appreciate, the embodiments of the apparatus and method for synchronized channel transmission of this invention can also be implemented within any multi-channel data transmission system in which it is desirable to reduce or eliminate interference between unsynchronized transmission channels.

Figure 14:
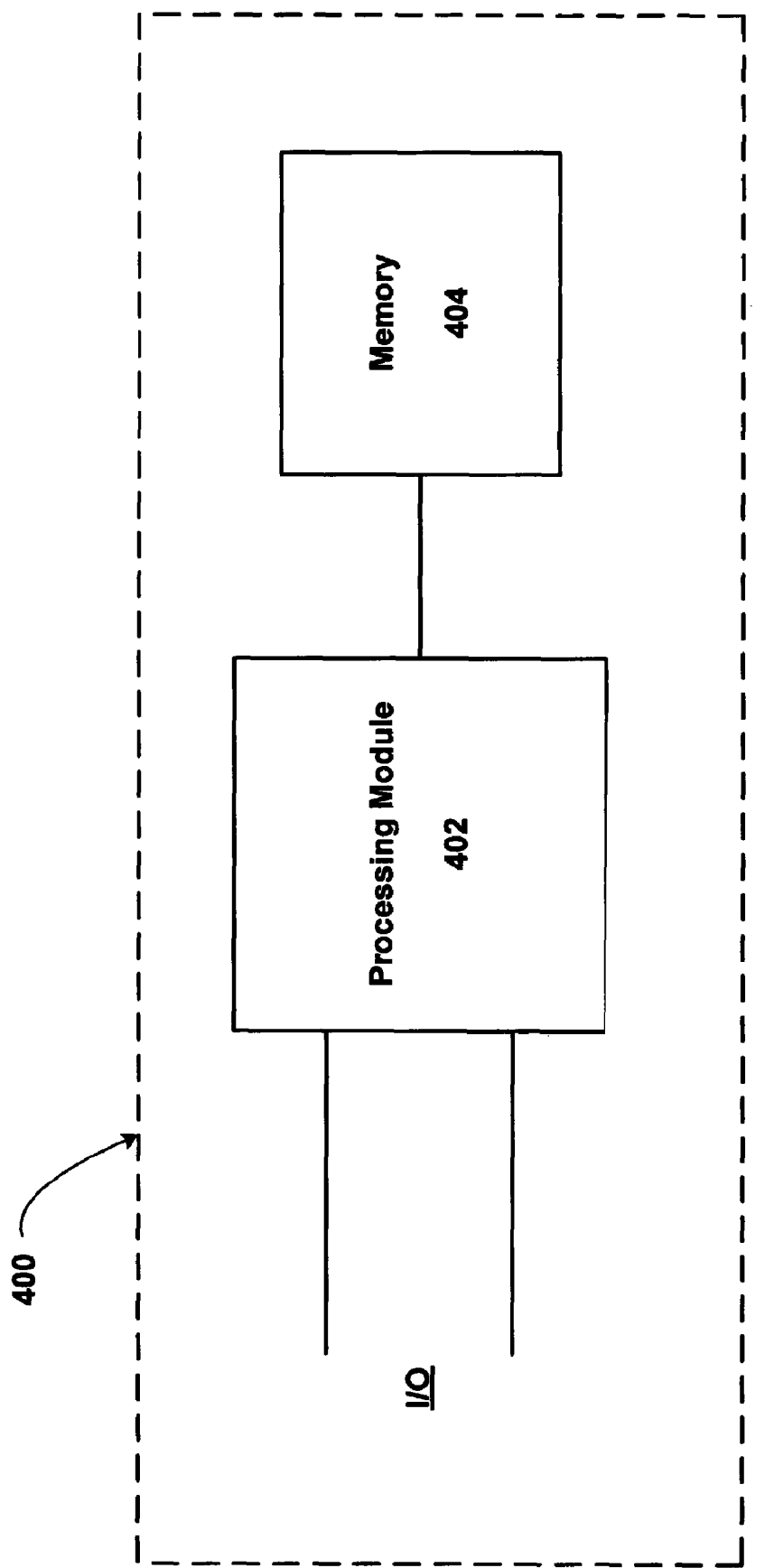
FIG. 14 is a schematic block diagram illustrating an apparatus for synchronized channel transmission in accordance with this invention.

A further embodiment of the present invention can comprise an apparatus for synchronized channel transmission. As shown in FIG. 14, the apparatus 400 can comprise a processing module 402 and a memory 404. Processing module 402 may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The memory 404 may be a single memory device or a plurality of memory devices. Such a memory device may be a read-only memory, random access memory, volatile memory, non-volatile memory, static memory, dynamic memory, flash memory, and/or any device that stores digital information. Note that when the processing module 402 implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry. The memory 404 stores, and the processing module 402 executes, operational instructions corresponding to at least some of the steps and/or functions illustrated in FIGS. 3-13.

In a particular embodiment of apparatus 400, the memory 404 is operably coupled to processing module 402 and includes operational instructions that cause the processing module 402 to generate a first data stream and a second data stream; packetize the first data stream to produce a first plurality of data packets; packetize the second data stream to produce a second plurality of data packets; baseband process the first plurality of data packets to produce a first plurality of symbols for each of the first plurality of data packets; baseband process the second plurality of data packets to produce a second plurality of symbols for each of the second plurality of data packets; convert the first plurality of symbols into a first radio frequency signal; convert the second plurality of symbols into a second radio frequency signal; and synchronize at least one of: generating the first and the second data streams, packetizing the first and second data streams, baseband processing the first and second plurality of data packets, and converting the first and second plurality of symbols. The memory 404 of apparatus 400 can further comprise operational instructions that cause the processing module 402 to perform all of the steps of the method for synchronized channel transmission of this invention described above with respect to FIG. 13.

The present invention provides for a method and apparatus for synchronized channel transmission that overcome the problems of prior art multi-channel transmission systems. Further embodiments of the present invention can comprise a multi-channel transmitter and a radio implementing a multi-channel transmitter. As one of average skill in the art will appreciate, other embodiments may be derived from the teaching of the present invention, without deviating from the scope of the claims.

What is claimed is:

1. A method for synchronized channel transmission by a multi-channel transmitter over a plurality of channels, comprising:
    generating a first data stream and a second data stream;
    packetizing the first data stream to produce a first plurality of data packets;
    packetizing the second data stream to produce a second plurality of data packets;
    baseband processing the first plurality of data packets to produce a first plurality of symbols for each of the first plurality of data packets;
    baseband processing the second plurality of data packets to produce a second plurality of symbols for each of the second plurality of data packets;
    converting the first plurality of symbols into a first radio frequency signal;
    converting the second plurality of symbols into a second radio frequency signal; and
    synchronizing via a synchronization device, each of the first plurality of symbols with corresponding ones of the second plurality of symbols for contemporaneous transmission, by synchronizing a symbol boundary and guard interval of one or more of the first plurality of symbols with a symbol boundary and guard interval of one or more of the second plurality of symbols.

2. The method of claim 1, further comprising:
    synchronizing the transmission of a first packet of the first plurality of data packets for contemporaneous transmission with a first packet of the second plurality of data packets.

3. The method of claim 2, wherein synchronizing the transmission of the first packet of the first plurality of data packets with the contemporaneous transmission of the first packet of the second plurality of data packets comprises delaying the transmission of one of: the first packet of the first plurality of data packets, and the first packet of the second plurality of data packets.

4. The method of claim 1, further comprising:
    synchronizing the transmission of each packet of the first plurality of data packets with the contemporaneous transmission of a corresponding packet of the second plurality of data packets.

5. The method of claim 4, wherein the corresponding packet comprises a closest-in-time packet of the second plurality of data packets to the each packet of the first plurality of data packets.

6. The method of claim 4, wherein synchronizing the transmission of each packet of the first plurality of data packets with the contemporaneous transmission of a corresponding packet of the second plurality of data packets comprises delaying, on a packet by packet basis, the transmission of one of: the each packet of the first plurality of data packets, and the corresponding packet of the second plurality of data packets.

7. The method of claim 1, further comprising encrypting the first and the second data streams.

8. The method of claim 1, further comprising modulating the first and the second data streams according to a preset modulation scheme.

9. The method of claim 8, wherein the modulation scheme is orthogonal frequency-division multiplexing.

10. The method of claim 1, wherein baseband processing the first and the second plurality of data packets further comprises appending a cyclic redundancy code ("CRC") to each data packet of the first and the second plurality of data packets.

11. The method of claim 1, further comprising:
synchronizing the start of each of the first and the second data streams.

12. An apparatus for synchronized channel transmission over a selected channel of a plurality of channels, the apparatus comprises:
a processing module; and
a memory operably coupled to the processing module, wherein the memory includes operational instructions that cause the processing module to:
generate a first data stream and a second data stream;
packetize the first data stream to produce a first plurality of data packets;
packetize the second data stream to produce a second plurality of data packets;
baseband process the first plurality of data packets to produce a first plurality of symbols for each of the first plurality of data packets;
baseband process the second plurality of data packets to produce a second plurality of symbols for each of the second plurality of data packets;
convert the first plurality of symbols into a first radio frequency signal;
convert the second plurality of symbols into a second radio frequency signal; and
synchronize each of the first plurality of symbols with corresponding ones of the second plurality of symbols for contemporaneous transmission, by synchronizing a symbol boundary and guard interval of one or more of the first plurality of symbols with a symbol boundary and guard interval of one or more of the second plurality of symbols.

13. The apparatus of claim 12, wherein the memory further comprises operational instructions that cause the processing module to synchronize the packetizing of the first and second data streams by synchronizing the transmission of a first packet of the first plurality of data packets with the transmission of a first packet of the second plurality of data packets.

14. The apparatus of claim 13, wherein the memory further comprises operational instructions that cause the processing module to synchronize the transmission of the first packet of the first plurality of data packets with the transmission of the first packet of the second plurality of data packets by delaying the transmission of one of: the first packet of the first plurality of data packets, and the first packet of the second plurality of data packets.

15. The apparatus of claim 12, wherein the memory further comprises operational instructions that cause the processing module to synchronize the packetizing of the first and second data streams by synchronizing the transmission of each packet of the first plurality of data packets with the transmission of a corresponding packet of the second plurality of data packets.

16. The apparatus of claim 15, wherein the corresponding packet comprises a closest-in-time packet of the second plurality of data packets to the each packet of the first plurality of data packets.

17. The apparatus of claim 15, wherein the memory further comprises operational instructions that cause the processing module to synchronize the transmission of each packet of the first plurality of data packets with the transmission of a corresponding packet of the second plurality of data packets by delaying, on a packet by packet basis, the transmission of one of: the each packet of the first plurality of data packets, and the corresponding packet of the second plurality of data packets.

18. The apparatus of claim 12, wherein the memory further comprises operational instructions that cause the processing module to encrypt the first and the second data streams.

19. The apparatus of claim 12, wherein the memory further comprises operational instructions that cause the processing module to modulate the first and the second data streams according to a preset modulation scheme.

20. The apparatus of claim 19, wherein the modulation scheme is orthogonal frequency-division multiplexing.

21. The apparatus of claim 12, wherein the memory further comprises operational instructions that cause the processing module to baseband process the first and the second plurality of data packets by appending a cyclic redundancy code ("CRC") to each data packet of the first and the second plurality of data packets.

22. The apparatus of claim 12, wherein the memory further comprises operational instructions that cause the processing module to synchronize generating the first and second data streams by synchronizing the start of each of the first and the second data streams.

23. A multi-channel transmitter for synchronized channel transmission over a selected channel of a plurality of channels, comprising:
a host processor operably coupled to generate at least a first data stream and a second data stream;
one or more media access controllers ("MACs") operably coupled to packetize the first data stream to produce a first plurality of data packets, and to packetize the second data stream to produce a second plurality of data packets;
one or more baseband physical layer ("BB PHY") modules operably coupled to baseband process the first plurality of data packets to produce a first plurality of symbols for each of the first plurality of data packets, and to baseband process the second plurality of data packets to produce a second plurality of symbols for each of the second plurality of data packets;
one or more radio frequency physical layer ("RF PHY") modules operably coupled to convert the first plurality of symbols into a first radio frequency signal, and to convert the second plurality of symbols into a second radio frequency signal; and
a synchronization device operably coupled to synchronize each of the first plurality of symbols with corresponding ones of the second plurality of symbols for contemporaneous transmission by synchronizing a symbol boundary and guard interval of one or more of the first plurality of symbols with a symbol boundary and guard interval of one or more of the second plurality of symbols.

24. The multi-channel transmitter of claim 23, wherein the one or more RF PHY modules comprise a first RF PHY module operably coupled to convert the first and the second plurality of symbols into a first and a second radio frequency signal, respectively, and wherein synchronizing the first and second plurality of symbols comprises synchronizing a symbol boundary of one or more of the first plurality of symbols with a symbol boundary of one or more of the second plurality of symbols.

25. The multi-channel transmitter of claim 24, wherein synchronizing the symbol boundary of one or more of the first plurality of symbols with the symbol boundary of one or more of the second plurality of symbols comprises synchronizing a guard interval of one or more of the first plurality of symbols with a guard interval of one or more of the second plurality of symbols.

26. The multi-channel transmitter of claim 23, wherein the one or more MACs comprise a first MAC operably coupled to packetize the first and the second data streams, and wherein the synchronization device synchronizes the transmission of a first packet of the first plurality of data packets with the transmission of a first packet of the second plurality of data packets.

27. The multi-channel transmitter of claim 26, wherein synchronizing the transmission of the first packet of the first plurality of data packets with the transmission of the first packet of the second plurality of data packets comprises delaying the transmission of one of: the first packet of the first plurality of data packets, and the first packet of the second plurality of data packets.

28. The multi-channel transmitter of claim 23, wherein the one or more MACs comprise a first MAC operably coupled to packetize the first and the second data streams, and wherein the synchronization device synchronizes the transmission of each packet of the first plurality of data packets with the transmission of a corresponding packet of the second plurality of data packets.

29. The multi-channel transmitter of claim 28, wherein the corresponding packet comprises a closest-in-time packet of the second plurality of data packets to the each packet of the first plurality of data packets.

30. The multi-channel transmitter of claim 28, wherein synchronizing the transmission of each packet of the first plurality of data packets with the transmission of a corresponding packet of the second plurality of data packets comprises delaying, on a packet by packet basis, the transmission of one of: the each packet of the first plurality of data packets, and the corresponding packet of the second plurality of data packets.

31. The multi-channel transmitter of claim 23, wherein the one or more MACs are operable to encrypt the first and the second data streams.

32. The multi-channel transmitter of claim 23, wherein the one or more MACs are operable to modulate the first and the second data streams according to a preset modulation scheme.

33. The multi-channel transmitter of claim 32, wherein the modulation scheme is orthogonal frequency-division multiplexing.

34. The multi-channel transmitter of claim 23, wherein baseband processing the first and the second plurality of data packets further comprises appending a cyclic redundancy code ("CRC") to each data packet of the first and the second plurality of data packets.

35. The multi-channel transmitter of claim 23, wherein the synchronization device synchronizes the start of each of the first and the second data streams.

36. The multi-channel transmitter of claim 23, wherein the one or more MACs transmit, on a packet-by-packet basis, the first plurality of data packets and the second plurality of data packets in response to an input from the host processor.

37. The multi-channel transmitter of claim 23, wherein one of the one or more MACs is a master MAC and one of the one or more MACs is a slave MAC.

38. The multi-channel transmitter of claim 23, wherein the multi-channel transmitter is a two-channel transmitter.

39. The multi-channel transmitter of claim 23, wherein the synchronization device is included within at least one of: the host processor, the one or more MACs, the one or more BB PHY modules, and the one or more RF PHY modules.

40. A radio comprising:
  a receiver section operably coupled to convert inbound radio frequency ("RF") signals into inbound data based on a receiver local oscillation;
  a transmitter section operably coupled to convert outbound data into outbound RF signals based on a transmitter local oscillation, wherein the transmitter section further comprises:
    one or more media access controllers ("MACs") operably coupled to packetize a first data stream to produce a first plurality of data packets, or to packetize a second data stream to produce a second plurality of data packets, wherein a host processor generates the first data stream and the second data stream;
    one or more baseband physical layer ("BB PHY") modules operably coupled to baseband process the first plurality of data packets to produce a first plurality of symbols for each of the first plurality of data packets, or to baseband process the second plurality of data packets to produce a second plurality of symbols for each of the second plurality of data packets;
    one or more radio frequency physical layer ("RF PHY") modules operably coupled to convert the first plurality of symbols into a first radio frequency signal, or to convert the second plurality of symbols into a second radio frequency signal; and
    a synchronization device operably coupled to synchronize each of the first plurality of symbols with corresponding ones of the second plurality of symbols for contemporaneous transmission by synchronizing a symbol boundary and guard interval of one or more of the first plurality of symbols with a symbol boundary and guard interval of one or more of the second plurality of symbols; and
  a local oscillator operably coupled to produce the transmitter local oscillation and the receiver local oscillation.

41. The radio of claim 40, wherein the one or more RF PHY modules comprise a first RF PHY module operably coupled to convert the first and the second plurality of symbols into a first radio frequency signal and a second radio frequency signal, respectively, and wherein synchronizing the first and second plurality of symbols comprises synchronizing a symbol boundary of one or more of the first plurality of symbols with a symbol boundary of one or more of the second plurality of symbols.

42. The radio of claim 41, wherein synchronizing the symbol boundary of one or more of the first plurality of symbols with the symbol boundary of one or more of the second plurality of symbols comprises synchronizing a guard interval of one or more of the first plurality of symbols with a guard interval of one or more of the second plurality of symbols.

43. The radio of claim 40, wherein the one or more MACs comprise a first MAC operably coupled to packetize the first and the second data stream, and wherein the synchronization device further synchronizes the transmission of a first packet of the first plurality of data packets with the transmission of a first packet of the second plurality of data packets.

44. The radio of claim 43, wherein synchronizing the transmission of the first packet of the first plurality of data packets with the transmission of the first packet of the second plurality of data packets comprises delaying the transmission of one of: the first packet of the first plurality of data packets, and the first packet of the second plurality of data packets.

45. The radio of claim 40, wherein the one or more MACs comprise a first MAC operably coupled to packetize the first and the second data stream, and wherein the synchronization device further synchronizes the transmission of each packet of the first plurality of data packets with the transmission of a corresponding packet of the second plurality of data packets.

46. The radio of claim 45, wherein the corresponding packet comprises a closest-in-time packet of the second plurality of data packets to the each packet of the first plurality of data packets.

47. The radio of claim 45, wherein synchronizing the transmission of each packet of the first plurality of data packets with the transmission of a corresponding packet of the second plurality of data packets comprises delaying, on a packet by packet basis, the transmission of one of: the each packet of the first plurality of data packets, and the corresponding packet of the second plurality of data packets.

48. The radio of claim 40, wherein the one or more MACs are operable to encrypt the first and the second data streams.

49. The radio of claim 40, wherein the one or more MACs are operable to modulate the first and the second data streams according to a preset modulation scheme.

50. The radio of claim 49, wherein the modulation scheme is orthogonal frequency-division multiplexing.

51. The radio of claim 40, wherein baseband processing the first and the second plurality of data packets further comprises appending a cyclic redundancy code ("CRC") to each data packet of the first and the second plurality of data packets.

52. The radio of claim 40, wherein the synchronization device further synchronizes the start of each of the first and the second data streams.

53. The radio of claim 40, wherein the one or more MACs transmit, on a packet-by-packet basis, the first plurality of data packets and the second plurality of data packets in response to an input from the host processor.

54. The radio of claim 40, wherein one of the one or more MACs is a master MAC and one of the one or more MACs is a slave MAC.

55. The radio of claim 40, wherein the multi-channel transmitter is a two channel transmitter.

56. The radio of claim 40, wherein the synchronization device is included within at least one of: the host processor, the one or more MACs, the one or more BB PHY modules, and the one or more RF PHY modules.

* * * * *